United States Patent
Pirahesh et al.

(10) Patent No.: US 7,478,080 B2
(45) Date of Patent: Jan. 13, 2009

(54) CANONICAL ABSTRACTION FOR OUTERJOIN OPTIMIZATION

(75) Inventors: Mir Hamid Pirahesh, San Jose, CA (US); Jun Rao, San Jose, CA (US); Calisto Zuzarte, Pickering (CA)

(73) Assignee: International Business Machines Corporation, Armonk, NY (US)

( * ) Notice: Subject to any disclaimer, the term of this patent is extended or adjusted under 35 U.S.C. 154(b) by 468 days.

(21) Appl. No.: 10/955,251

(22) Filed: Sep. 30, 2004

(65) Prior Publication Data

US 2006/0074901 A1 Apr. 6, 2006

(51) Int. Cl.
G06F 7/00 (2006.01)

(52) U.S. Cl. .................. 707/2; 707/3; 707/4; 707/5
(58) Field of Classification Search .................. None
See application file for complete search history.

(56) References Cited

U.S. PATENT DOCUMENTS

| | | | | |
|---|---|---|---|---|
| 5,345,585 A * | 9/1994 | Iyer et al. | ............... | 707/2 |
| 5,412,804 A * | 5/1995 | Krishna | ............... | 707/2 |
| 5,551,031 A * | 8/1996 | M. Cheng et al. | ............... | 707/2 |
| 5,557,791 A * | 9/1996 | Cheng et al. | ............... | 707/2 |
| 5,659,728 A * | 8/1997 | Bhargava et al. | ............... | 707/2 |
| 5,671,403 A * | 9/1997 | Shekita et al. | ............... | 707/3 |
| 5,680,603 A * | 10/1997 | Bhargava et al. | ............... | 707/2 |
| 5,701,454 A * | 12/1997 | Bhargava et al. | ............... | 707/2 |
| 5,701,455 A * | 12/1997 | Bhargava et al. | ............... | 707/2 |
| 5,713,015 A * | 1/1998 | Goel et al. | ............... | 707/4 |
| 5,724,568 A * | 3/1998 | Bhargava et al. | ............... | 707/2 |
| 5,752,017 A * | 5/1998 | Bhargava et al. | ............... | 707/2 |
| 5,822,750 A * | 10/1998 | Jou et al. | ............... | 707/2 |
| 5,832,477 A * | 11/1998 | Bhargava et al. | ............... | 707/2 |
| 5,855,012 A * | 12/1998 | Bhargava et al. | ............... | 707/2 |
| 5,864,847 A * | 1/1999 | Goel et al. | ............... | 707/4 |
| 5,875,447 A * | 2/1999 | Goel et al. | ............... | 707/4 |
| 5,960,427 A * | 9/1999 | Goel et al. | ............... | 707/4 |
| 6,138,111 A * | 10/2000 | Krishna | ............... | 707/2 |
| 6,199,063 B1 * | 3/2001 | Colby et al. | ............... | 707/4 |
| 6,516,310 B2 * | 2/2003 | Paulley | ............... | 707/2 |
| 6,665,663 B2 | 12/2003 | Lindsay et al. | | |
| 2002/0116357 A1* | 8/2002 | Paulley | ............... | 707/1 |
| 2005/0086208 A1* | 4/2005 | Bestgen et al. | ............... | 707/3 |

* cited by examiner

*Primary Examiner*—Hung Q Pham
*Assistant Examiner*—Hubert Cheung
(74) *Attorney, Agent, or Firm*—Gibb & Rahman, LLC

(57) ABSTRACT

A system, apparatus, and program storage device implementing a method of optimizing queries used for searching a computerized database, wherein the method comprises providing a query comprising a sequence of inner joins and outerjoins; and rewriting the query by producing a sequence of outer Cartesian products for the query; producing a sequence of nullification operations on the query; and producing a sequence of best match operations on the query. The method further comprises optimizing the query using a query execution plan for processing the rewritten query, wherein the query execution plan expands a search space in the database for which the rewritten query may be run.

3 Claims, 15 Drawing Sheets

Fig. 1A
Prior Art

Q1
SELECT R.k, S.k, T.k
FROM R LEFT JOIN (S INNER JOIN T ON S.a=T.a)
ON R.b=S.b and R.c=T.c

Fig. 1B
Prior Art

Q2
SELECT R.k, S.k, T.k
FROM R LEFT JOIN (S INNER JOIN T ON S.a=T.a)
ON R.a=S.a

Fig. 1C
Prior Art

SELECT R.k, S.k, T.k
FROM R LEFT JOIN  S ON R.b=S.b) INNER JOIN T
ON R.a=T.a and R.c=T.c

Fig. 1D
Prior Art

SELECT R.k, S.k, T.k
FROM (R LEFT JOIN T ON R.a=T.a) LEFT JOIN S
ON R.a=S.a and T.a=S.a

Fig. 1E

WITH Nullified AS    (
SELECT ...
FROM (R LEFT JOIN S ON R.b=S.b) LEFT JOIN T
ON S.a=T.a and S.c=T.c)
SELECT R.k, S.k, T.k ...
FROM Nullified
WHERE ...

Fig. 1F

WITH Nullified AS    (
SELECT ...
FROM (R LEFT JOIN T ON R.a=T.a) LEFT JOIN S
ON S.a=S.a)
SELECT R.k, S.k, T.k ...
FROM Nullified
WHERE ...

| (R,S,T) | |
|---|---|
| R x S x T | {(1,2,2)} |
| $\theta_{Prs,S}$ | {(1, -,2)} |
| $\theta_{Pst,T}$ | {(1, -, -)} |

$\theta_{Pst,T}(\theta_{Prs.S} \dots)$

Fig. 2A

| (R,S,T) | |
|---|---|
| R x S x T | {(1,2,2)} |
| $\theta_{Pst,T}$ | {(1,2,2)} |
| $\theta_{Prs,S}$ | {(1, -,2)} |

$\theta_{Prs,S}(\theta_{Pst.T} \dots)$

Fig. 2B

```
Input     an operator tree T of an outerjoin query
Output    a nullification set (NS_R) for each relation R
          in the query
Method:
For each node n traversed in postfix order in T
  If (n is a base relation R)
    NS_R = φ
  Else (n is a join with predicate P)
    Let R_L and R_R be the set of all relations referenced
      by P in the left and right side respectively
    if (n is an outer join)
      For each relation r in the right side
        NS_r = NS_r U {P} U {p ∈ NS_t | t ∈ R_L}
    Else if (n is an inner join)
      For each relation l in the left side
        NS_l = NS_l U {P} U {p ∈ NS_t | t ∈ R_R}
      For each relation r in the right side
        NS_r = NS_r U {P} U {p ∈ NS_t | t ∈ R_L}
```

Fig. 3

Q1: $R \xrightarrow{R.b=S.b \ \& \ R.c=T.c} (S \underset{\bowtie}{\overset{S.a=T.a}{}} T)$ $NS_R$: ϕ
$NS_S$: {R.b=S.b, R.c=T.c, S.a=T.a}
$NS_T$: {R.b=S.b, R.c=T.c, S.a=T.a}

Q2: $(R \xrightarrow{R.a=S.a} (S \xrightarrow{S.a=T.a} T)$ $NS_R$: ϕ
$NS_S$: {R.a=S.a}
$NS_T$: {R.a=S.a, S.a=T.a, <u>R.a=T.a</u>}

Q3: $(R \xrightarrow{R.a=S.a} S) \xrightarrow{S.b=T.b} T$ $NS_R$: ϕ
$NS_S$: {R.a=S.a}
$NS_T$: {R.a=S.a, S.b=T.b}

Q4: $((R \xrightarrow{R.a=S.a} S) \xrightarrow{R.b=T.b} T) \xrightarrow{S.c=U.c \ \& \ T.d=U.d} U$ $NS_R$: ϕ
$NS_S$: {R.a=S.a}
$NS_T$: {R.b=T.b}
$NS_U$: {R.a=S.a, R.b=T.b, S.c=U.c, T.d=U.d}

Fig. 4

Input    S and L, two relation sets to be joined: $NS_R$, the qualification sets as computed by the algorithm in Table 1

Output   a list of plans that join S and L, each plan carries an additional property, the qualification sets NS' for the plan tree Method:
Part I
$C_j = \phi$
For each conjunct c in C that is eligible on S and L
   If ($c \in NS_s$ for each relation s in S) // c fully nullifies S
     add c to $C_j$
   Else
    if ($c \in NS_l$ for each relation l in L) // c fully nullifies L
      add c to $C_j$
   Remove c from C
If ($C_j$ is not empty)
   If ($C_j$ fully nullifies S and L) plan $S \overset{C_j}{\bowtie} L$ Else if ($C_j$ fully nullifies S) plan $L \overset{C_j}{\longrightarrow} S$ Else if ($C_j$ fully nullifies L) plan $S \overset{C_j}{\longrightarrow} L$
   Compute the nullification sets NS' for the join plan
Else reject this (S,L) pair Part II
If (S U L includes all relations to be joined)
   For each generated plan P (with nullification sets NS')
     For each R where $NS_R - NS'_R \neq \phi$
       P=adding $\lambda_{NS_R - NS'_R, R}$ on top of P
     If (and $\lambda$ is added above)
       $P_f$=adding a $\beta$ operator on top of P

Fig. 6

$$Q1:\ R \xrightarrow{R.b=S.b\ \&\ R.c=T.c} (S \overset{S.a=T.a}{\bowtie} T)$$

| Planning Input | $C=\{c1:R.b=S.b,\ c2:R.c=T.c,\ c3:S.a=T.a\}$ <br> $NS_R=\phi \quad NS_S=\{c1,c2,c3\} \quad NS_T=\{c1,c2,c3\}$ |
|---|---|
| Planning Part I | $(R,S) \quad\quad c1[R,S] \quad\quad R \xrightarrow{c1} S$ <br> $(RS,T) \quad\quad c2[R\underline{S},\underline{T}] \quad\quad RS \xrightarrow{c2\ \&\ c3} T$ <br> $\quad\quad\quad\quad\quad\ c3[R\underline{S},\underline{T}]$ <br> $P:\ (R \xrightarrow{c1} S) \xrightarrow{c2\ \&\ c3} T$ |
| Planning Part II | $NS'_R=\phi \quad NS'_S=\{c1\} \quad NS'_T=\{c1,c2,c3\}$ <br> $P_f:\ \beta(\theta_{c2\ \&\ c3.S}((R \xrightarrow{c1} S) \xrightarrow{c2\ \&\ c3} T))$ |

Fig. 7A $$Q2:\ R \xrightarrow{R.a=S.a} (S \xrightarrow{S.a=T.a} T)$$

| Planning Input | $C=\{c1:R.a=S.a,\ c2:S.a=T.a,\ c3:R.a=T.a\}$ <br> $NS_R=\phi \quad NS_S=\{c1\} \quad NS_T=\{c1,c2,c3\}$ |
|---|---|
| Planning Part I | $(R,T) \quad\quad c3[R,\underline{T}] \quad\quad R \xrightarrow{c3} T$ <br> $(RT,S) \quad\quad c1[R\underline{T},S] \quad\quad RT \xrightarrow{c1} S$ <br> $\quad\quad\quad\quad\quad\ c2[R\underline{T},S]$ <br> $P:\ (R \xrightarrow{c3} T) \xrightarrow{c1} S$ |
| Planning Part II | $NS'_R=\phi \quad NS'_S=\{c1\} \quad NS'_T=\{c3\}$ <br> $P_f:\ \beta(\theta_{c1\ \&\ c2,T}((R \xrightarrow{c3} T) \xrightarrow{c1} S))$ |

Fig. 7B

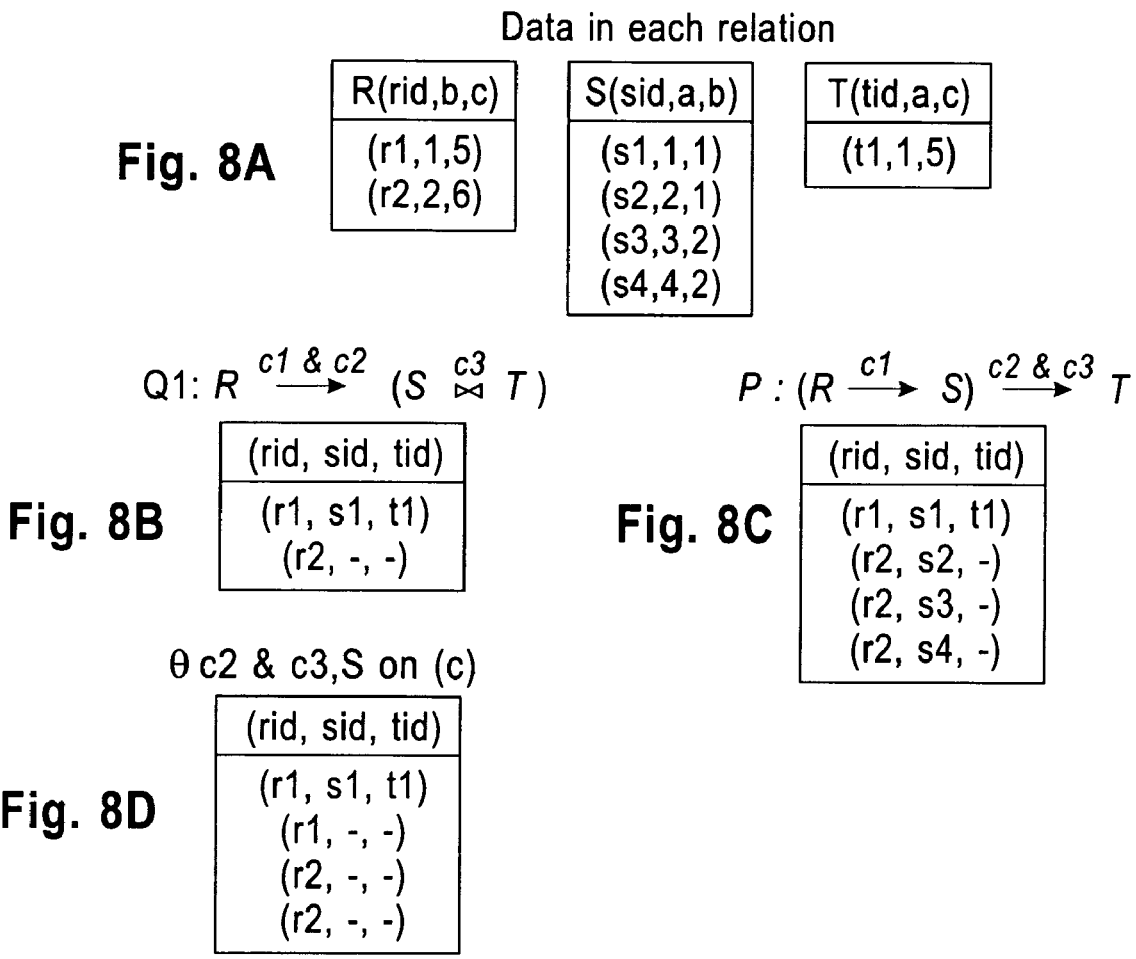

Data in each relation

Fig. 8A

| R(rid,b,c) |
|---|
| (r1,1,5) |
| (r2,2,6) |

| S(sid,a,b) |
|---|
| (s1,1,1) |
| (s2,2,1) |
| (s3,3,2) |
| (s4,4,2) |

| T(tid,a,c) |
|---|
| (t1,1,5) |

$Q1: R \xrightarrow{c1\ \&\ c2} (S \underset{\bowtie}{c3} T)$

Fig. 8B

| (rid, sid, tid) |
|---|
| (r1, s1, t1) |
| (r2, -, -) |

$P: (R \xrightarrow{c1} S) \xrightarrow{c2\ \&\ c3} T$

Fig. 8C

| (rid, sid, tid) |
|---|
| (r1, s1, t1) |
| (r2, s2, -) |
| (r2, s3, -) |
| (r2, s4, -) |

$\theta\ c2\ \&\ c3, S$ on $(c)$

Fig. 8D

| (rid, sid, tid) |
|---|
| (r1, s1, t1) |
| (r1, -, -) |
| (r2, -, -) |
| (r2, -, -) |

Fig. 9

```
SELECT    K₁, ..., Kₙ,
          max(K₁)     OVER (  ORDER BY FSK
                              ROWS ...) as K₁_p,
          ...
          max(Kₙ)     OVER (  ORDER BY FSK
                              ROWS ...) as Kₙ_p,
          rownumber() OVER (  ORDER BY FSK
                           ) as rownum
FROM      Nullified
WHERE     rownum = 1 or
          K₁ <> K₁_p or
          ...
          Kₙ <> Kₙ_p
```

$(K_1, K_2, K_3)$
$(1, 1, 1)$
$(1, 1, -)$
$(1, 2, 3)$
sorted by $<K_1, K_2, K_3>$ $(K_1, K_2, K_3)$
$(1, 1, 1)$
$(1, 2, 3)$
$(1, 1, -)$
sorted by $<K_1, K_3, K_2>$ $(K_1, K_2, K_3)$
$(1, 1, 1)$
$(1, 1, -)$
$(1, 2, 3)$
$(1, -, 1)$
sorted by $<K_1, K_2, K_3>$ $(K_1, K_2, K_3)$
$(1, 1, 1)$
$(1, -, 1)$
$(1, 2, 3)$
$(1, 1, -)$
sorted by $<K_1, K_3, K_2>$

Fig. 12A

```
Q1
WITH    Nullified AS    (
SELECT  R.k, T.k,
        CASE WHEN R.c=T.c then S.k end as S.k
FROM    (R LEFT JOIN S ON R.b=S.b) LEFT JOIN T
        ON S.a=T.a and R.c=T.c )
SELECT  R.k, S.k, T.k,
        max(R.k) OVER (ORDER BY R.k,S.k
                              ROWS ...) as Rk_p,
        max(S.k) OVER (ORDER BY R.k,S.k
                              ROWS ...) as Sk_p,
        rownumber() OVER (ORDER BY R.k,S.k)
                              as rownum
FROM    Nullified
WHERE   rownum = 1 or
        R.k <> Rk_p or
        S.k <> Sk_p
```

Fig. 12B

```
Q2
WITH    Nullified AS    (
SELECT  R.k, S.k,
        CASE WHEN R.a=S.a then T.k end as T.k
FROM    (R LEFT JOIN T ON R.a=T.a) LEFT JOIN S
        ON R.a=S.a )
SELECT  R.k, S.k, T.k,
        max(R.k) OVER (ORDER BY R.k,S.k,T.k
                              ROWS ...) as Rk_p,
        max(S.k) OVER (ORDER BY R.k,S.k,T.k
                              ROWS ...) as Sk_p,
        max(T.k) OVER (ORDER BY R.k,S.k,T.k
                              ROWS ...) as Tk_p,
        rownumber() OVER (ORDER BY R.k,S.k,T.k)
                              as rownum
FROM    Nullified
WHERE   rownum = 1 or
        R.k <> Rk_p or
        S.k <> Sk_p or
        T.k <> Tk_p
```

Fig. 13

Q1. Find parts of a certain brand and size and show their corresponding line item and available quantity, if any.

```
select p_type, l_orderkey, l_linenumber, ps_availqty
from part left join
    ( lineitem inner join partsupp
        on l_partkey - ps_partkey and
            l_suppkey - ps_suppkey )
    on p_partkey - l_partkey and
        p_partkey - ps_partkey
where p_brand - 'Brand#35' and p_size in (5)
order by p_type, l_orderkey, ps_availqty
fetch first 100 rows only
```

Q2. Find certain parts and show their corresponding line item, if any, and available quantity, if any.

```
select p_partkey, p_type, l_orderkey, ps_availqty
from part_lt_1000 left join
    ( lineitem left join partsupp_gt_995
        on l_partkey - ps_partkey )
    on p_partkey - l_partkey
order by p_partkey, p_type, l_orderkey, ps_availqty
fetch first 100 rows only
```

Fig. 14

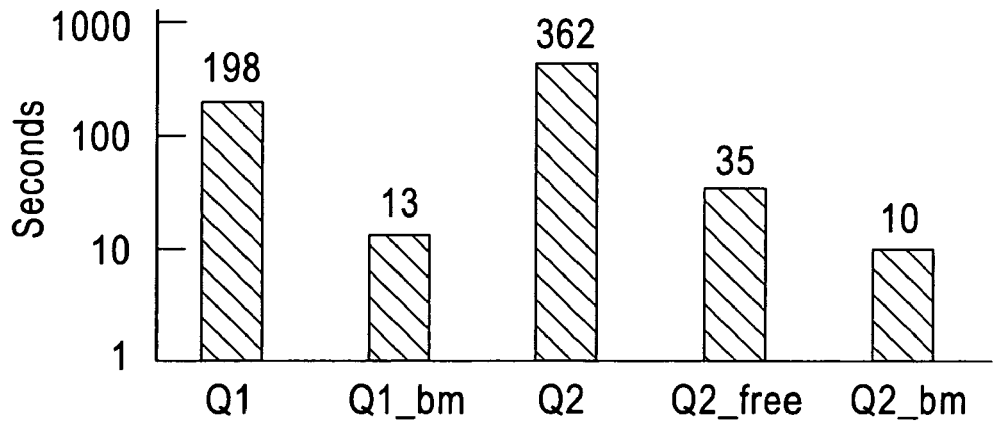

CANONICAL ABSTRACTION FOR OUTERJOIN OPTIMIZATION

BACKGROUND OF THE INVENTION

1. Field of the Invention

The embodiments of the invention generally relate to database management, and more particularly to query techniques used for optimizing database searching.

2. Description of the Related Art

An outerjoin is a modification of an inner join that preserves all information from one or both of its relations. It can be further categorized into left(→), right(←) or full(↔) outerjoins, depending on which side (of the relation) needs to be preserved. For example, the following SQL query will return all of the department names and employees within each department. For those departments without employees, the department names are listed with the employee name set to null.

SELECT department.dname, employee.ename
FROM department LEFT JOIN employee ON
department.no=employee.dno Outerjoins are important because they are frequently used in the following traditional applications: (a) certain online analytical processing (OLAP) queries where it is necessary to preserve tuples from a fact table with unknown (or missing) dimensional values; (b) constructing hierarchical views that preserve objects with no children; and (c) queries generated by external tools and a query rewriting unit. The emergence of XML (eXtensible Markup Language) provides more applications for outerjoins. For example, in information integration, schema mapping involves the discovery of a query or a set of queries that transform the source data into a new structure. When mapping relational data to XML, the transformation queries rely heavily on outerjoins to avoid missing data. In another example, the construction of XML results in XQUERY and often needs the outerjoin semantic so that a parent element can survive without a matching child element.

An inner join query can always be canonically represented as a sequence of Cartesian products of all relations followed by a sequence of selection operations, each applying a conjunct in the join predicates. Such a canonical abstraction is very powerful because it enables an optimizer to use any join order for plan generation. Unfortunately, such a canonical abstraction for outerjoin queries has not been developed. As a result, existing techniques tend to prevent certain join orders from planning, which can lead to a severe performance penalty.

Optimizing queries with outerjoins is challenging because outerjoins are not always commutative with inner joins. The following are some rules on evaluation orders for joins and one-sided outerjoins, if all predicates are null-intolerant, which means that they cannot evaluate to true when referencing a null value:

$$R \xrightarrow{Prs} (S \xrightarrow{Prt} T) = (R \xrightarrow{Prs} S) \xrightarrow{Prt} T$$

$$(R \xrightarrow{Prs} S) \xrightarrow{Prt} T = (R \xrightarrow{Prt} T) \xrightarrow{Prs} S$$

$$R \xrightarrow{Prs} (S \xrightarrow{Prt} \triangleleft T) \neq (R \xrightarrow{Prs} S) \xrightarrow{Pst} \triangleleft T$$

The problem of outerjoin reordering has been considered in the past, with most of the conventional approaches attempting to expand the search space for outerjoin queries in one way or another.

Some conventional approaches have identified a special class of query called a simple query, which has the property that the query graph (without specifying the join order) unambiguously determines the semantic of the query. Given a simple query, a conflicting set is computed for each join predicate by analyzing the query graph. The conflicting set of predicate P contains some other join predicates, which if applied after P, will yield incorrect results. Based on the conflicting set, two approaches in plan generation are applicable; one without compensation and one with compensation. The former only generates plans where all reordering is valid and thus does not need further compensation. The later allows plans containing invalid reordering (always generating more tuples) and later tries to compensate for the incorrect results through a generalized outerjoin. However, these approaches generally do not consider all join orders. Also, no efficient implementation has yet been given for a generalized outerjoin operation.

Other solutions, such as those described in U.S. Pat. No. 6,665,663 issued to Lindsay et al. on Dec. 16, 2003, the complete disclosure of which in its entirety is herein incorporated by reference, use an extended eligibility list (EEL) to represent the conflicts among join predicates. Although EEL is logically equivalent to the conflicting set representation, it is easier to be exploited by an optimizer. Compensation is performed through nullification and best match operations. Again, not all join orders are considered and no efficient implementation is given for the best match operation.

Still other solutions adapt the previous framework to deal with predicates with more than one conjunct. Generally, such a predicate is treated as a single predicate so that the conjuncts within it cannot be broken up.

Other conventional approaches also determine that null-intolerant predicates can simplify queries using outer joins. For example, if predicate Prs is null-intolerant, the following rule holds:

$$R \triangleright \triangleleft (S \xleftarrow{Pst} T) = R \triangleright \triangleleft (S \triangleright \triangleleft T)$$

However, the conventional approaches generally do not achieve the goal of allowing all join orders. For example, conjuncts in the ON clause of an outerjoin are always treated as a whole and cannot be applied separately. As another example, when outerjoins exist, transitivity cannot be applied to generate redundant predicates.

To see the impact of this, two queries (Q1 and Q2) are illustrated in FIGS. 1(a) and 1(b). In Q1, the outerjoin uses two conjuncts as the join predicate. Supposing that both relations S and T are large, one would like to be able to apply one of the conjuncts, say R.b=S.b, to join relation R with S first (as shown in FIG. 1(c)). In Q2, two join predicates (from different ON clauses) share a common attribute. Supposing that S is rather large, one would desire the ability to generate an additional predicate R.a=T.a through transitivity, and to use it for joining relation R with T first (as shown in FIG. 1(d)). Unfortunately, neither FIG. 1(c) nor FIG. 1(d) gives the correct results. If it is assumed that R(k,a,c)={(1,1,1,1)}, S(k,a, b)={(2,1,1)}, and T(k,a,c)=φ, the answers for Q1 and Q2 are A1={(1,-,-)} and A2={(1,2,-)} respectively (where "-" represents a "null"). On the other hand, the query in FIG. 1(c) generates φ (changing the inner join to left outerjoin in FIG. 1(c) still yields the wrong answer A2) and that in FIG. 1(d) generates A1. Had the outerjoins been changed to inner joins, both transformations would have been valid.

While the conventional approaches were beneficial for the purposes they were designed to solve, there remains a need for improving the performance of outerjoin queries by optimizing the outerjoin queries to match the level to that of an inner join query.

SUMMARY OF THE INVENTION

In view of the foregoing, an embodiment of the invention provides a method of optimizing outerjoin queries performed on a database, wherein the method comprises rewriting an outerjoin query in a canonical abstraction representation; and optimizing the rewritten outerjoin query representation with a join optimizer, wherein the outerjoin query comprises any number of left or right outerjoins and inner joins, and wherein join predicates are null-intolerant, and wherein the canonical abstraction representation further comprises producing a sequence of outer Cartesian products; producing a sequence of nullifications for each relation in the query; and performing a final best match operation on the query. The method further comprises permitting all join orders to be considered during planning on the outerjoin query. In the process of producing a sequence of nullifications, the nullifications are determined by adding all predicates that nullify the relation to a nullification set. The method further comprises applying a proper set of join predicates for each join; determining what nullification operations need to be further applied after all the tables are joined; and determining whether a best match operation should be added after all of the relations are joined. Additionally, the method comprises implementing the final best match operation by sorting an input into the final best match operation in one or more passes and applying filtering on each pass, wherein a number of sorting passes is minimized by analyzing the nullification set, and wherein the implementing of the final best match operation is performed using an online analytical processing (OLAP) functionality in a standard structured query language (SQL).

Another aspect of the invention provides a system and method of optimizing queries used for searching a computerized database, wherein the method comprises providing a query comprising a sequence of inner joins and outerjoins; and rewriting the query by producing a sequence of outer Cartesian products for the query; producing a sequence of nullification operations on the query; and producing a sequence of best match operations on the query. The method further comprises optimizing the query using a query execution plan for processing the rewritten query, wherein the query execution plan expands a search space in the database for which the rewritten query may be run.

Another embodiment of the invention provides a computer-implemented apparatus for optimizing outerjoin queries, wherein the apparatus comprises a computer system, wherein the query optimization is performed by the computer system to optimize queries performed on a database stored on the computer system; and computer logic, performed by the computer system, the computer logic comprising a first protocol adapted to rewrite an outerjoin query in a canonical abstraction representation; and a second protocol adapted to optimize the rewritten outerjoin query representation with a join optimizer. The outerjoin query comprises any number of left or right outerjoins and innerjoins, and wherein join predicates are null-intolerant. Moreover, the canonical abstraction representation of the first protocol further comprises a first sub-protocol adapted to produce a sequence of outer Cartesian products; a second sub-protocol adapted to produce a sequence of nullifications for each relation in the query; and a third sub-protocol adapted to perform a final best match operation on the query.

Another aspect of the invention provides a system for optimizing queries used for searching a computerized database, wherein the system comprises means for providing a query comprising a sequence of inner joins and outerjoins; means for producing a sequence of outer Cartesian products for the query; means for producing a sequence of nullification operations on the query; means for producing a sequence of best match operations on the query; and means for optimizing the query using a query execution plan for processing the query.

Generally, the embodiments of the invention provide a novel canonical abstraction for outerjoin queries. Under such abstraction, an outerjoin query can be rewritten as a sequence of outer Cartesian products, followed by nullification operations and a final best match operation. The inventive abstraction resembles that for inner join queries by allowing all join orders and preserving the property of commutativity and transitivity. As a result, the inventive technique provides more powerful query optimization than any existing query optimization techniques.

Moreover, for a given outerjoin query, the embodiments of the invention provide a method of producing its outerjoin canonical abstraction and extend an inner join optimizer to generate plans in an expanded search space by taking advantage of the abstraction. Additionally, the embodiments of the invention also provide an efficient implementation of the best match operation based on the OLAP amendment in SQL. Furthermore, experimental results derived from testing conducted on a commercial database system demonstrate the performance advantage of the inventive technique.

These and other aspects of embodiments of the invention will be better appreciated and understood when considered in conjunction with the following description and the accompanying drawings. It should be understood, however, that the following description, while indicating preferred embodiments of the invention and numerous specific details thereof, is given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The embodiments of the invention will be better understood from the following detailed description with reference to the drawings, in which:

FIGS. 1(a) and 1(b) illustrate outerjoin queries Q1 and Q2;

FIGS. 1(c) and 1(d) illustrate incorrect naively rewritten queries according to conventional techniques;

FIGS. 1(e) and 1(f) illustrate correctly rewritten queries using nullification and best match approaches according to an embodiment of the invention;

FIGS. 2(a) and 2(b) illustrate the effect of changing the order of performing a nullification operation according to an embodiment of the invention;

FIG. 3 illustrates a methodology for generating nullification sets according to an embodiment of the invention;

FIG. 4 illustrates examples of nullification sets according to an embodiment of the invention;

FIG. 6 illustrates a methodology for a plan generation process using nullification sets according to an embodiment of the invention;

FIGS. 7(a) and 7(b) illustrate plan generation processes for the queries of FIGS. 1(e) and 1(f) according to an embodiment of the invention;

FIGS. 8(a) through 8(d) illustrate the tuples in three relations R, S, and T and the results of evaluating Q1 of FIG. 7(a) according to an embodiment of the invention;

FIG. 9 illustrates a basic β query using OLAP functions according to an embodiment of the invention;

FIGS. 12(a) and 12(b) illustrate the queries Q1 and Q2 of FIGS. 1(a) and 1(b), respectively, rewritten using β queries according to an embodiment of the invention;

FIG. 13 illustrates the SQL of two queries Q1 and Q2 according to an embodiment of the invention;

FIG. 14 illustrates a graphical representation of the execution time of the plan generation processes for four queries according to an embodiment of the invention;

DETAILED DESCRIPTION OF PREFERRED EMBODIMENTS OF THE INVENTION

Figure 5:
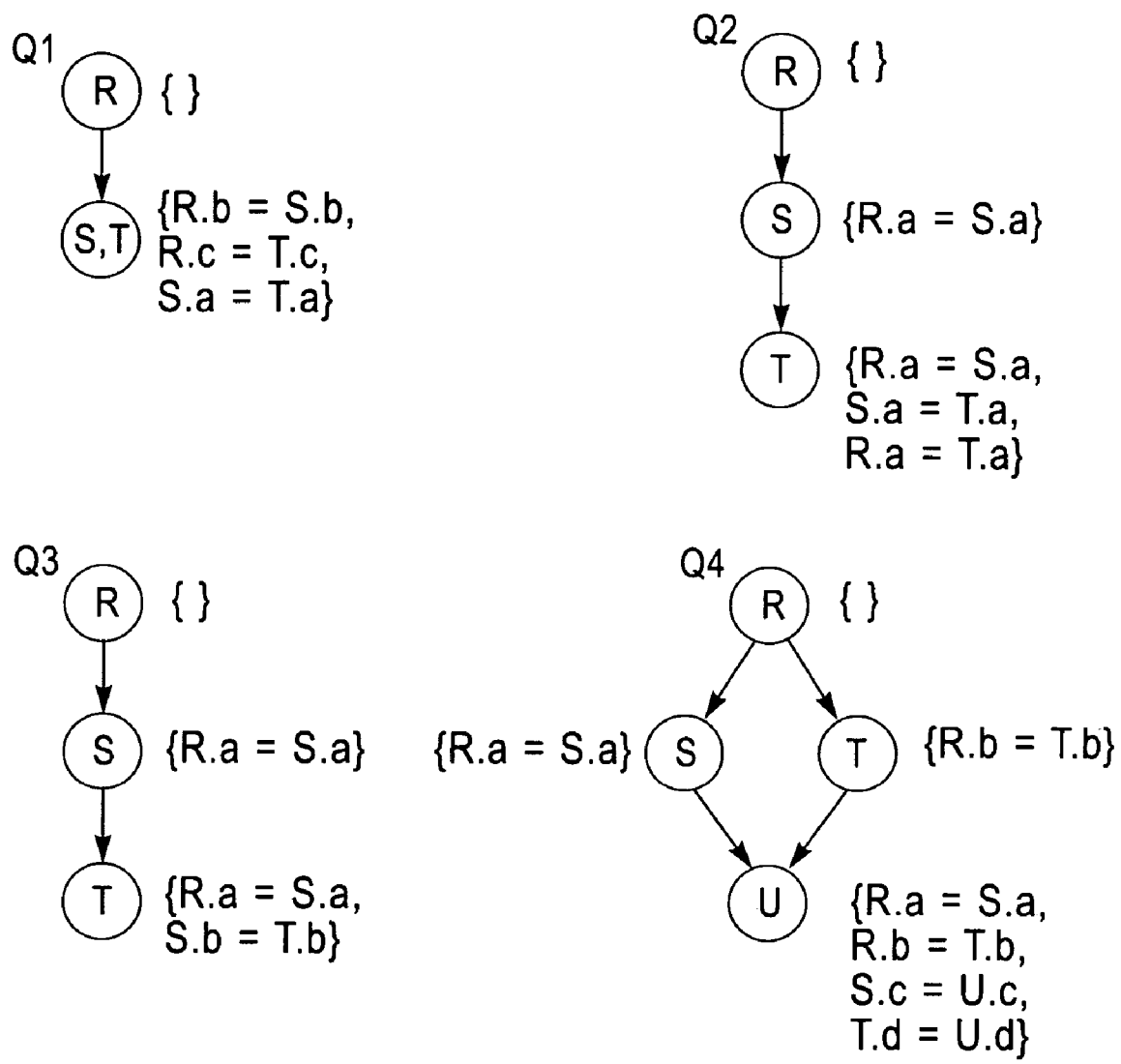
FIG. 5 illustrates examples of directed graphs for queries Q1 through Q4 according to an embodiment of the invention.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

As mentioned, there remains a need for improving the performance of outerjoin queries by optimizing the outerjoin queries to match the level to that of an inner join query. To address this need for a given query containing a sequence of inner and outerjoins, the embodiments of the invention provide a canonical abstraction based on three operations: outer Cartesian products, nullification, and best match. Like the inner join abstraction, the inventive outerjoin abstraction permits all join orders, and preserves the property of both commutativity and transitivity. This allows one to generate plans never considered before, but in a very desirable manner for performance reasons. Accordingly, an aspect of the invention provides a methodology that produces such a canonical abstraction, and a method that extends an inner join optimizer to generate plans in an expanded search space. Moreover, the embodiments of the invention also provide an efficient implementation of the best match operation using the OLAP functionalities in SQL: 1999. Furthermore, experimental results illustrate that the embodiments of the invention can significantly improve existing techniques on the performance of outerjoin queries. Referring now to the drawings, and more particularly to FIGS. 1(e) through 19 where similar reference characters denote corresponding features consistently throughout the figure, there are shown preferred embodiments of the invention.

In order to solve the problem of the incorrectly rewritten queries of FIGS. 1(c) and 1(d) completely, the embodiments of the invention determine a canonical abstraction suitable for outerjoins. For a given query having a mixture of inner and outerjoins, the embodiments of the invention solve the abovementioned problem by expressing the query mixture in an outerjoin canonical abstraction, which use outer Cartesian products of all relations, followed by a sequence of nullification operations, followed by a best match operation at the end. The inventive abstraction has the property of both commutativity and transitivity, and hence provides many additional opportunities for query optimization.

Although a nullification operation is relatively straightforward to implement, a best match operation is fairly complex. Thus, implementation of the inventive abstraction utilizes an efficient implementation of a best match operation. However, instead of implementing the best match operation directly, the embodiments of the invention decompose a best match into one or more simpler building blocks, each of which can then be implemented by exploiting the OLAP functionality in the latest SQL standard known in the industry.

Using the approach provided by the embodiments of the invention, Q1 and Q2 (of FIGS. 1(a) and 1(b)) can now be rewritten as queries in FIGS. 1(e) and 1(f) (with further details provided in FIGS. 12(a) and 12(b)), respectively. In both cases (rewritten Q1 and Q2), the rewritten queries perform a selection over a predefined view nullified (by the WITH clause shown in FIGS. 1(e) and 1(f)). Accordingly, the input relations now have a more desirable join order than the join orders shown in FIGS. 1(c) and 1(d). Therefore, the rewritten queries shown in FIGS. 1(e) and 1(f) have a significant performance advantage over the conventional rewritten queries shown in FIGS. 1(c) and 1(d). This is experimentally demonstrated as further described below.

First, some preliminary assumptions are made in support of the methodology provided by the embodiments of the invention. An outerjoin query is defined as including any number of left outerjoins (right outerjoins are converted to left outerjoins) and inner joins. An outerjoin query is given by an operator tree where all leaf nodes are base relations (which can include local predicates) and inner nodes are join operators. For any outerjoin in the tree, the preserving side is always the left and the null-producing side is always the right. It is also assumed that all join predicates are null-intolerant (this implies no Cartesian products in the query) and the operator tree has already been simplified (i.e., outerjoins are converted to inner joins if possible). Lastly, it is assumed that there is always a key attribute KID (the tuple ID can always be used to serve as the KID) for each relation, and all KIDs are carried along to the root of the operator tree. Furthermore, a large class of queries is satisfied under these assumptions (in particular all simple queries are satisfied under these assumptions).

Additionally, some preliminary definitions are applicable in further support of the methodology provided by the embodiments of the invention. First, given a relation R, a Boolean predicate p, and a set of attributes a ∈R, a nullification operation $\theta_{P,a}(R)$ is defined as: {r∈R| if p≠true, set r.a to null}. In such an operation, P is then referred to as a nullification predicate and a is referred to as a nullified attribute. However, because SQL:1999 has a three-valve logic, p≠true is not the same as !p=true. For example, when p evaluates to unknown, the former expression is satisfied, but the latter is not. Moreover, θ has the following properties:

$$\theta_{P1\&p2,a}(R)=\theta_{P1,a}(\theta_{P2,a}(R))=\theta_{P2,a}(\theta_{P1,a}(R)) \quad (\text{``\&''} \text{ denotes conjunction}) \qquad (0)$$

$$\theta_{P,a1\cup a2}(R)=\theta_{P,a1}(\theta_{P,a2}(R)=\theta_{P,a2}(\theta_{P,a1}(R))) \qquad (1)$$

(The equation still holds when P references a1 and a2.)

Second, tuple r1 dominates tuple r2 if for every non-null attribute in r2, r1 has the same value in the corresponding attribute, and r2 has more attributes with null values than r1. This also refers to those attributes where r2 is null and r1 is not as dominated. For example, tuples t1=(1,-,3) and t2=(1,2,-) are both dominated by (1,2,3). The second attribute in t1 and the third attribute in t2 are the dominated attribute respectively.

Third, given a relation R, a best match operation β(R) is defined as: {r∈R|r is not dominated or duplicated by any other tuples in R and is not an all-null tuple}. Those tuples removed from R by β(R) operation are referred to as spurious tuples.

Fourth, given two relations R and S, an outer Cartesian product, (x), is redefined as $$R \overset{t=1}{\leftrightarrow} S.$$

The only difference between an outer Cartesian product and the conventional one is that when one of the relations (for example, R) is empty, the former returns all tuples in S and pads null on attributes in R, while the latter returns an empty set.

Fifth, the outerjoins and inner joins can be decomposed using θ, β and xx in properties (2) and (3) below. According to the embodiments of the invention, the outer Cartesian product handles empty inputs, which is not provided in the conventional approaches. For simple presentation, in $\theta_{P,a}$, the relation name a is used if a includes all attributes in the relation (the relation is nullified by P). This representation is referred to as BNR (best-match nullification representation).

$$R \xrightarrow{Prs} S = \beta(\theta_{Prs,S}(R \times S)) \qquad (2)$$

$$R \underset{}{\triangleright\triangleleft} \overset{Prs}{} S = \beta(\theta_{Prs,R\cup S}(R \times S)) \qquad (3)$$

The above representations generally indicate that an outerjoin predicate nullifies the null-producing relation, and an inner join predicate nullifies both input relations. Moreover, the result of an inner join or an outerjoin does not contain spurious tuples since a β operation is applied in both. Furthermore, both β and θ take a relation as input and return a relation (with the same schema) in the output. Therefore, they are both composable; i.e., they can be used as the input of other relational operators. The commutative rules among β, θ, and × are summarized below:

$$\beta(\beta(R))=\beta(R) \qquad (4)$$

$$\beta(R)\times S=\beta(R\times S) \qquad (5)$$

$$\theta_{P,a}(R)\times S=\theta_{P,a}(R\times S), \text{ where } P \text{ only refers to } R \text{ and } a\in R \qquad (6)$$

$$\beta(\theta_{P,a}(\beta(R)))=\beta(\beta(\theta_{P,a}(R)))=\beta(\theta_{P,a}(R)) \qquad (7)$$

In the above rules, property (4) indicates that two consecutive best matches can be reduced to one; properties (5) and (6) indicate that an outer Cartesian product is commutative with a best match and with a nullification operation; and property (7) indicates that a best match is commutative with a nullification operation so long as there is a best match at the very end. Using the above rules, a given BNR of an outerjoin query may be converted by pushing all outer Cartesian products as far inside as possible and removing intermediate best matches. For example, the following transformation can occur:

$$(R \xrightarrow{Prs} S) \xrightarrow{Pst} T = \beta(\theta_{Pst,T}(\theta_{Prs,S}(R \times S \times T))) \qquad (8)$$

$$R \xrightarrow{Prs} (S \triangleright\triangleleft \overset{Pst}{} T) = \beta(\theta_{Prs,S\cup T}(\theta_{Pst,S\cup T}(R \times S \times T))) \qquad (9)$$

However, θ operations, themselves, are not commutative. This can be illustrated by considering the right side of equation (8). Suppose that R(a)={(1)}, S(a)={(2)}, and T(a)={(2)}, respectively. R×S×T produces exactly one tuple {(1,2,2)}. Also suppose that Prs and Pst are given by R.a=S.a and S.a=T.a, respectively. FIG. 2(a) illustrates the steps of evaluating the two θ operations in the order given by equation (8); i.e., $\theta_{Prs,S}$ followed by $\theta_{Pst,T}$. Since Prs evaluates to false, S.a is set to null after applying $\theta_{Prs,S}$. In the next step Pst evaluates to unknown because of the null value set in the previous row. It would have evaluated to true if the null value were not set. Therefore, T.a is set to null in the end. FIG. 2(b) shows that the result has changed when the order of the two θ operations is switched. The reason is that Pst is evaluated earlier and does not see the null value it is supposed to see, and therefore evaluates to true instead of unknown. Consequently, switching the θ operations in equation (8) gives an incorrect result. Moreover, in equation (0), the two θ operations are exchangeable. The difference lies in that the two θ operations in equation (0) nullify the same attribute sets, whereas the θ operations in equation (8) do not. Finally, it follows that changing the order of the two θ operations in equation (9) does not affect the correctness of the final result.

The embodiments of the invention utilize a canonical abstraction for outerjoins in the following manner. For a given outerjoin query, the embodiments of the invention seek a canonical abstraction resembling that of an inner join query. A BNR of an outerjoin query nearly provides such a canonical abstraction except that the θ operations are not interchangeable. Again, considering the sequence $\theta_{Pst,T}$ ($\theta'_{Prs,S}$ . . . ) in equation (8), in order to differentiate the two θ operation, the inner θ operation is referred to as θ'. The reason why θ cannot be moved inside θ' is that Pst then will not see the new null values in S updated by θ'. It is the new null values that are of most concern. Null values present in relation S itself do not affect the reordering of the two θ operations. Since all predicates are null-intolerant, the following rippling effect holds: Prs≠trueS is nullPst≠trueT is null. This implies Prs≠trueT is null, which is equivalent to adding a $\theta_{Prs,T}$. By adding such an implied θ operation, the semantic of the original expression is not changed. Moreover, the relative evaluating order of the θ operations are no longer significant because the rippling effect of the generated nulls which prevents θ from reordering is obviated. For example, if $\theta_{Prs,T}$ are applied on the last row in FIG. 2(b), then the same final result as was generated in FIG. 2(a) is achieved. It is easy to verify that applying $\theta_{Pst,T}$, $\theta'_{Prs,S}$ and $\theta_{Prs,T}$ in any other sequence also produces the correct result. The rippling effect is transitive and can pass through multiple predicates. For example, given a sequence $\theta_{Ptu,U}(\theta_{Pst,T}(\theta_{Prs,S} \ldots))$, an implied $\theta_{Prs,U}$ can be inferred since the null value in S (introduced by Prs) first propagates to T through Pst, and then to U through Ptu. Next, it is demonstrated that for a given BNR, all implied $\theta$ operations can be precomputed, the addition of which gives commutativity among $\theta$.

Given an outerjoin query, each relation R may be associated with a nullification set $NS_R$, which contains all predicates that can be used in a $\theta$ operation on R. A methodology of generating the nullification sets is provided in FIG. 3. As shown in FIG. 3, each node in the operator tree of the query is visited in postfix order. If a node corresponds to a relation, its nullification set is simply initialized. If a node is an outerjoin, then the join predicate P nullifies each relation r in the right side (again, this is always the null-producing side) and so should be added to $NS_R$. However, this is not enough. Taking, each relation t that is referenced by P and is from the left side, predicates in $NS_t$ nullify t, which indirectly nullify each r. Therefore, these predicates (implied) are also added to each $NS_R$. If a node is an inner join, then the P nullifies relations in both sides. Thus, the same computation can basically be performed once for relations in the left side and another for those in the right side. By induction, it can be shown that the nullification sets that are computed are complete in the sense that all predicates that can introduce null in R are included in $NS_R$. This is further demonstrated as follows.

The nullification sets computed by the methodology in FIG. 3 satisfies the following property: applying all $\theta_{NS_R,R}$ in any order is equivalent to applying the $\theta$ sequence in the original BNR. Additionally, two equivalent outerjoin queries (always generating the same result) have the same nullification set for each corresponding relation.

The methodology shown in FIG. 3 is illustrated on four queries in FIG. 4. In Q1, S.a=T.a is added to both $NS_S$ and $NS_T$ by the inner join. The outerjoin join then includes R.b=S.b and R.c=T.c in the nullification set of S and T since they are both in the right side of the join. The process for Q2 is similar and the nullification sets are shown below the query in FIG. 4. The computation for Q1 and Q2 are relatively straightforward since there is no implied $\theta$ involved. In Q3, predicate R.a=S.a is first added to $NS_S$ by the first join, and is subsequently added to $NS_T$ by the second join because of the implied $\theta$. Finally, a four-way join query is shown in Q4 in FIG. 4. It can be observed that predicates R.a=S.a and R.b=T.b are carried over to $NS_U$ by the last join.

The nullification sets that are computed actually provide the desired canonical abstraction. It is clear that an outerjoin query can always be represented by a sequence of outer Cartesian products, followed by a sequence of $\theta_{NS_R,R}$ for each relation R in the query followed by a final $\beta$ operation. This outerjoin canonical abstraction provides many additional opportunities for optimizing an outerjoin query. For example, first, since the outer Cartesian products can be evaluated in any binary sequence, this essentially allows for the consideration of all the join orders for planning. Secondly, the commutativity of $\theta$ operations and outer Cartesian products allows for a $\theta$ to be "pushed" as deep as where it first becomes eligible (i.e., all referenced attributes are present in the input). Also, a $\beta$ operation may be introduced after a $\theta$ and then the $\beta(\theta(\ldots \times \ldots))$ sequence may be converted back to either an inner join or an outerjoin (using the reverse of equations (2) and (3)). Third, when the nullification set has multiple conjuncts, a "big" $\theta$ may be split into two smaller ones, each applying a subset of the conjuncts (based on equation (0)). This means that conjuncts given by the same ON clause in an outerjoin query do not always have to be applied together, which is impossible in the conventional approaches. For example, in Q1, it becomes possible to apply predicate R.b=S.b by itself and therefore to join R and S together first. Lastly, the transitive closure of predicates may be computed within each nullification set. In this regard, taking Q2 in FIG. 4 as an example, the underlined predicate R.a=T.a is generated through transitivity in $NS_T$. This additional predicate serves as the only link between R and T, which means that R and T can now be joined using this predicate. This additional conjunct can actually introduce a subtle semantic difference. For example, in the situation when R.a, S.a, and T.a are 5, null, and 7, respectively, R.a=S.a and S.a=T.a evaluates to unknown, while R.a=S.a and S.a=T.a and S.a=T.a evaluates to false. However, this is suitable for a $\theta$ operation because the testing on the nullification predicate does not distinguish between unknown and false (they are both not true).

Now, all of the nullification sets for an outerjoin query can be organized into a directed graph where each node n corresponds to a unique nullification set (noted as $NS_n$) and there is an edge from node n1 to node n2 if $NS_{n1} \subset NS_{n2}$. Then, each relation R is assigned to the node n where $NS_n=NS_R$. Such a directed graph is connected and acyclic, and is herein referred to as $DAG_{ns}$, which is acyclic. Otherwise, from a cycle n1, n2, ..., nk, n1 in the graph, $NS_{n1} \subset NS_{n2} \ldots \subset NS_{nk} \subset NS_{n1}$ is derived, which is impossible. A root node in a $DAG_{ns}$ is defined as the node n whose $NS_n$ is the smallest. It is possible to verify that a $DAG_{ns}$ has only one root node and all nodes can be reached by a path starting from the root. This is verified by induction in FIG. 3, where after processing each node n in the original operation tree, the $DAG_{ns}$ for the subtree rooted at n has exactly one root node and the rest of the nodes are reachable from the root node. As such, the $DAG_{ns}$ for queries Q1 to Q4 are shown in FIG. 4, where each circle represents a node. Relations assigned to a node are shown inside the circle and the corresponding nullification set is next to the circle. As shown, in Q1 two relations S and T are assigned to the same node and the $DAG_{ns}$ for Q4 is not a tree.

The following observations can be made for the $DAG_{ns}$ for an outerjoin query according to the embodiments of the invention. First, for each tuple t in the fully nullified query result (i.e., after all $\theta_{NS_R,R}$ have been applied), if the KID of relation S (assigned to node n) is null, then the KID of each relation T assigned to node n, and n's descendants are all null. The reasoning is that T always has an equivalent or a super set of nullification predicates to that of S. Second, for a node n in $DAG_{ns}$, predicates in $NS_n$ can only refer to relations assigned to nodes on the path from root to n. Third, relations assigned to the same node n in a $DAG_{ns}$ can be inner joined together using predicates in $NS_n$. Fourth, an outerjoin query equivalent to the original one can be composed by first inner joining relations assigned to the same node in a $DAG_{ns}$ and then for each pair of (parent, child) nodes, outer joining the intermediate results on the nodes (results from the child serves as the right side), using predicates in $NS_{child}$-$NS_{parent}$. Additionally, the nullification sets could also be useful for some other outerjoin queries. For example, given n relations and k predicates, it can be determined how many different outerjoin queries can be formed. A simple upper bound is $k^n$ since each predicate can belong to one or more nullification sets. A closer estimation can be derived by analyzing all of the possible $DAG_{ns}$ that can be composed from the n relations and k predicates.

The outerjoin canonical abstraction may be used for plan generation in a bottom-up join optimizer. For an outerjoin query, it is assumed that the nullification set of each relation $NS_R$ is calculated using the methodology given in FIG. 3 and that transitive closure has been computed within each $NS_R$. Predicates in $NS_R$ are given by a set of conjuncts C. Because any join order is allowed in the inventive canonical abstraction, the plan search space for outerjoin queries becomes much larger, which increases the possibility of finding a "cheaper" plan. On the other hand, the larger the search space, the longer the optimization time. In order to avoid wasting too much time on generating unpromising plans, the search space is limited using the following heuristic rules: (1) a θ operation is always converted back into inner or outer joins whenever possible (by introducing a β after it); (2) unconvertible θ operations are deferred until all relations are joined; (3) each conjunct is considered only once as a join predicate when it first becomes eligible, however, the same conjunct can be used again for nullification in the end; (4) no outer Cartesian product is allowed by its own. The above limits preserve the most promising plans while reducing the search space considerably, and thus providing a good balance between plan quality and the time required for optimization.

A typical inner join optimizer starts by enumerating each non-overlapping pair of relation sets to be joined. It then finds all eligible predicates and tries to use them to join the two sets together. Various physical operators (e.g., hash joins) are then considered for the actual join implementation. To avoid generating redundant plans, the optimizer maintains a memory-resident structure (MEMO) for holding non-pruned plans. Each MEMO entry corresponds to a unique logical expression, which is typically determined by a relation set and an applied predicate set. Plans corresponding to the same logical expression are inserted into the same MEMO entry. A plan with a higher cost is pruned if there is a cheaper plan with the same or more general properties for the same MEMO entry. The MEMO structure is populated from the bottom up such that entries for smaller relation sets are filled before those for larger relation sets. Plan properties are used to distinguish among plans corresponding to the same logical expression. For example, if a plan P produces an interesting order that can avoid a required sort subsequently, it might be better than a cheaper unsorted plan with the same logical expression. Keeping tuple ordering as a plan property prevents plans such as P from being pruned too early.

The goal is to extend the inner join optimizer for outerjoin support. To achieve this, the embodiments of the invention reuse the join enumeration process and for each pair of relation sets (S, L) to be joined together, a new method as illustrated in FIG. 6 is presented. As shown in FIG. 6, the method is divided into two parts. The first part is called on every (S, L) pair while the second part is only called when S ∪ L contains all relations in the query. An additional property, the nullification sets NS' corresponding to the plan tree is also maintained in each plan.

The first part of the method iterates through each conjunct c in C that is eligible on (S, L). If c fully nullifies either S (i.e., for each s∈S, c∈$NS_s$) or L, it is added to a set $C_j$, which will later be used as join predicates. Otherwise, c is ignored because it cannot be converted back to a join predicate. In either case, c is removed from C and will not be considered in subsequent joins. The method then decides which type of join $C_j$ shall be used for. If $C_j$ fully nullifies both S and L, an inner join will be used. Otherwise, a left outerjoin will be chosen and the fully nullified relation set is used as the null-producing (right) side of the join. The new plan property NS' is propagated in a similar manner as the methodology given in FIG. 3. Additionally, according to the embodiments of the invention, it is not possible for two conjuncts c1 and c2 in $C_j$ to have different nullification patterns; i.e., it is not possible that c1 nullifies both S and L, while c2 only nullifies one of them, or that c1 nullifies S but c2 nullifies L and vice versa. If these situations were possible, then conflicts would occur when selecting join types. The following illustrates why the above situations are not possible, and hence would never occur, according to the embodiments of the invention.

For any two conjuncts c1 and c2 in $C_j$ used to join S and L together in FIG. 6, the following can never occur: (a) c1 fully nullifies both S and L, c2 fully nullifies either S or L, but not both; and (b) c1 only fully nullifies S, c2 only fully nullifies L. The proof to this supposition is that for the original operator tree T, if a conjunct c refers to a relation R and is not in $NS_R$, then R ≺ S for each S, c∈$NS_S$, where ≺ compares the infix ordering of the two relations in T. It is assumed that both c1 and c2 exist in the original operator tree (generated conjuncts can also be handled accordingly). The following three cases may be considered. Case (1): if both c1 and c2 are outerjoin predicates in the original query, then c1 and c2 can only fully nullify either S or L, but not both (again, c1 and c2 are not eligible in S itself, nor in L). Suppose that c1 nullifies L and c2 nullifies S, there exists an $S_i$∈S referenced by c1 and an $L_j$∈L referenced by c2. Using the previously-described observation, the following infix ordering occurs in the original operator tree: $S_i$ ≺ l∈L and $L_j$ ≺ s∈S. However, this implies $S_i$ ≺ $S_i$, which is impossible. For the other two cases where at least one of the conjunct is used as an inner join predicate in the original query, it can be similarly shown that neither situations (a) or (b) is possible.

Now, with regard to the second part of the method provided in FIG. 6, that of when all relations are joined together, the compensation (if any) needed for each plan P generate must be decided. In order to do this, $NS'_R$ is compared with $NS_R$ for each relation R. It can be observed that $NS'_R$ is always a subset of $NS_R$, which can be proven by induction on the building process of P. If $NS_R$-$NS'_R$ is not empty, then it is known that R is not completely nullified, and a $\theta_{NS-NS'_R,R}$ operator is added on top of P to complete the nullification. Such an R is referred to as further nullified. If any θ operator is added, a final β operator is added to create the final plan $P_f$. Moreover, the nullification sets for $P_f$ is exactly the same as NS for the original operation tree. It is be easily seen that the methodologies provided by the embodiments of the invention will always generate a plan corresponding to the join order in the original query and such a plan does not need further nullification.

The inventive method may be further illustrated by showing the plan generation process for queries Q1 and Q2 (from FIGS. 1(a) through 1(f)). FIG. 7(a) describes the planning for Q1. The input of the planning process includes the conjunct set C and the nullification set for each relation. The first of part of the planning process begins with the relation set pair (R, S). The only eligible conjunct is c1. In FIG. 7(a), in the bracket next to a conjunct, its nullification pattern is shown by underlining the nullified relation in both inputs. Since c1 only nullifies S, the first join is constructed as $$R \stackrel{c1}{\to} S.$$

Next, the pair (RS, T) is considered, and c2 and c3 are eligible. Both conjuncts nullify T but not RS (neither nullifies R). Therefore, the second join is constructed as an outerjoin (Ton the right side) using both conjuncts. Moreover, c3 is an inner join predicate in Q1 and is now automatically converted into an outerjoin predicate. The plan generated at the end of the first part of planning is given by P. Moving to the second part, the nullification sets for plan P are first computed as shown by NS'. Comparing NS' with NS, it is determined that c2 and c3 are missing in NS'$_S$. Therefore, they are used to further nullify S. Further nullification can introduce spurious tuples, which are removed by the final β operator in plan P$_f$.

FIG. 7(b) shows the planning process for Q2. The conjunct c3 generated through transitivity is also added to C. Supposing that the relation set (R, T) is considered, then c3 becomes eligible and nullifies T. Thus, c3 is used to construct an outerjoin. Had it been impossible to exploit transitivity, then the join between R and T would not have been possible. The construction of the second join for (RT, S) is also interesting. Here, both c1 and c2 are eligible, and c1 nullifies S and can be used as an outerjoin predicate. However, c2 fully nullifies neither RT (it does not nullify R) nor S. Therefore, c2 cannot be used as a join predicate and is ignored. Then c1 is used together with c2 to further nullify T to create the final plan P$_f$.

Keeping the additional property NS' in each plan is important. For example, using the join plan P:

$$\left(R \xrightarrow{c1} S\right) \xrightarrow{c2 \& c3} T$$

generated for Q1 in FIG. 7(a), P contains the same set of relations and applied predicates as the original plan $$R \xrightarrow{c1 \& c2} (S \triangleright\triangleleft T)$$

(referred to as P0). Supposing that P is cheaper than P0, it is not practical to merely prune P0 at this moment because P requires further compensation (through θ and β operations), after which the cost of P can be actually higher than P0, which does not require further compensation. The new plan property NS'serves to distinguish between the two plans P and P0 so that they do not prune against each other, where NS' is different from NS. Such an extension is an example of the classic space and time tradeoff, in which plan storage is traded for potentially better plan quality.

A θ operation can be easily implemented using the case expression in SQL. For example, θ$_{P,a}$ can be implemented by an expression "CASE WHEN P THEN a END". Although not specified explicitly, a null value will be returned for the expression if the test in WHEN fails. The implementation of β operations occurs in the manner described below.

Given a join result of n relations R$_1$, . . . ,R$_n$ (referred to as a set R$_{1-n}$) and a set of k relations R$_{b1}$, . . . ,R$_{bk}$ (together referred to as R$_b$) that are further nullified, it is desirable to implement the final β operation that removes all spurious tuples introduced because of further nullification. The nullification set for each relation R is given by NS$_R$. The further nullified join result is referred to as a relation Nullified. For the sake of simplicity, it is assumed that Nullified only includes the KID (K$_i$) of each relation. A direct implementation of a β operation is possible, but extremely difficult because of the intrinsic complexity of the operation. Instead, an easier approach is building a β operation using standard SQL functionalities. A SQL query implementing a β operation is herein referred to as a β query.

FIG. 8(a) illustrates the tuples in three relations R, S, and T for a given query Q1 (such as query Q1 of FIG. 7(a)). The result of evaluating Q1 is given in FIG. 8(b). Now, considering the plan P generated in FIG. 7(a) that chooses a different join sequence, FIG. 8(c) illustrates the join result of P and FIG. 8(d) illustrates the result after P is further nullified. Comparing FIG. 8(b) with FIG. 8(d), it can be seen that in FIG. 8(d) the second tuple is dominated by the first one and fourth tuple is duplicated by the third one. Both the second and the fourth tuple are removed by the β operation. Sorting Nullified rid, sid, tid⟩ (nulls sort last), gives the result a favorable ordering; i.e., dominating tuples are always sorted before dominated ones and a spurious tuple always finds a dominating or duplicated tuple right before it. Then, the β operation is performed through a single pass of Nullified using the following SQL query to filter out the spurious tuples. It is assumed that when accessing each tuple, each tuple's immediate previous (whose attributes ae sppended with _p) is also accessible as well. The SQL query is as follows:

```
SELECT      *
FROM        Nullified
WHERE       rid < > rid_p or
            tid < > tid_p or
            sid < > sid_p
```

If a tuple t is not spurious, it will not dominate the tuple (t_p) before t (otherwise, t_p will sort after t because of the favorable ordering). Thus, t will differ from t_p on at least one of the three KIDs and the values in the differing KIDs are not null. This is precisely what the three disjuncts in the WHERE clause test. Moreover, each disjunct evaluates to unknown on nulls. For example, in FIG. 8(d), the third tuple (not spurious) differs from the second tuple on rid (neither rid is null). On the other hand, if t is spurious, each of its KID must either be null or match the corresponding value in t_p, which dominates or duplicates t. Therefore, none of the disjuncts is satisfied. For example, it is easy to verify that in FIG. 8(d), the second tuple (dominated) and the fourth tuple (duplicated) will be filtered out by the disjuncts in the WHERE clause. In order to use such an approach to implement β, it is necessary to determine how to access the previous tuple together with the current tuple in SQL and how to find a sort key that gives a favorable ordering of the tuples.

SQLs have become ever more powerful over the past several years through various standard extensions. However, until now much new functionality has been overlooked and not fully exploited. For example, the OLAP amendment was standardized in SQL:1999 and are now supported by most major database products. The OLAP amendment returns ranking, row numbering, and existing column function information as a scalar value in a query result through an "OVER . . . WINDOW construct" expression. Each window construct can be accompanied by an "ORDER BY" and a "PARTITION BY" clause, which specifies the ordering and the partitioning for tuples in the window. For example, the following query can by used to compute the five-day average of a company's (for example, IBM) stock price on each day.

```
SELECT      day
            AVG(price) OVER
                (ORDER BY day DESC
                ROWS BETWEEN 2 PRECEEDING
                AND 2 FOLLOWING)
                AS 5day_avg
FROM        IBM_stock
```

The OLAP amendment provides the answer to the first question. A window construct "ROWS BETWEEN 1 PRECED- ING AND 1 PRECEDING" (simply represented as "ROWS . . . " herein) provides a link to the previous tuple. If a favorable order is given by a sort key $FSK=\langle K_1, \ldots, K_n \rangle$, then a basic β query as shown in FIG. 9 may be composed. Again, it is assumed that null values are sorted after the non-null ones. Each $K_{i\_p}$ computes $K_i$ in the previous tuple. A special case is made in dealing with the very first tuple, which does not have a preceding tuple. Since the planning methodology provided in FIG. 6 does not generate all-null tuples, the very first tuple, if existing, is never spurious. This is handled by the first disjunct in FIG. 9 that accepts a tuple if its rownum equals to one.

Figures 10A, 10B, 10C, 10D, 11:
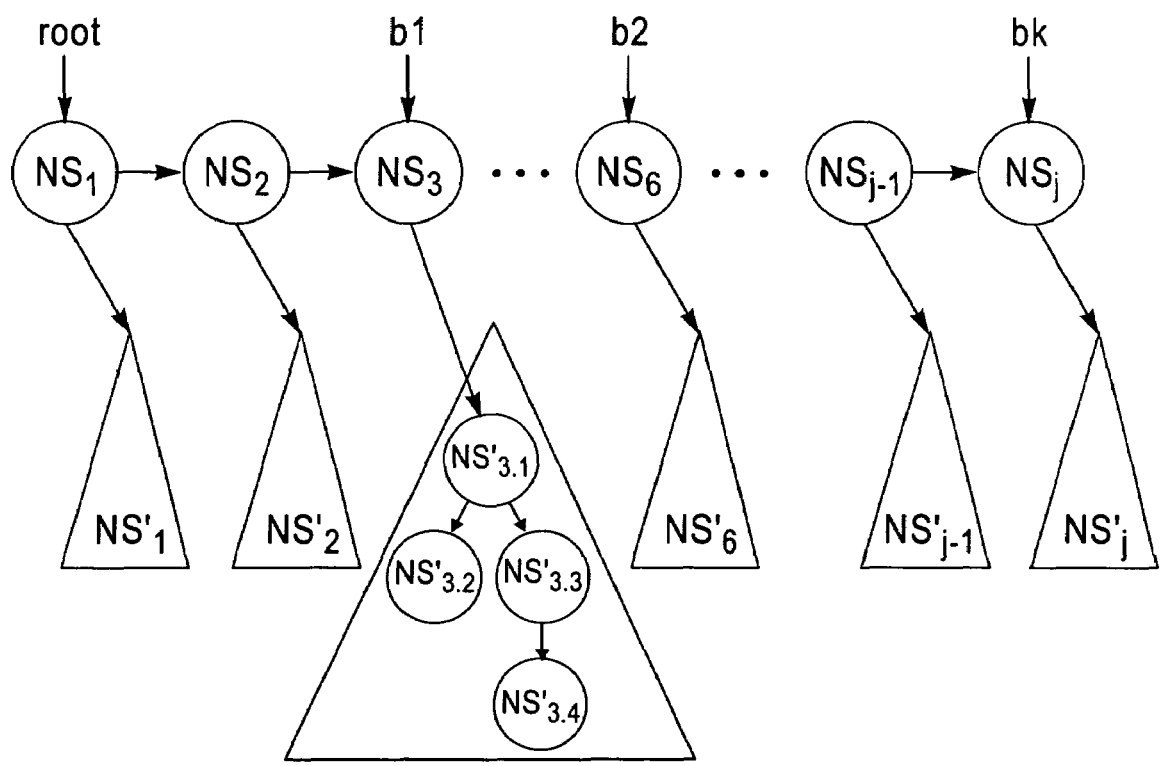
FIGS. 10(a) through 10(d) illustrate examples of a favoring ordering sequence according to an embodiment of the invention.
FIG. 11 illustrates various nullification sets schematically.

The key to the basic β query is the favorable ordering of tuples. However, it is not obvious how to construct a sort key that gives a favorable ordering. That is, it is not obvious what constitutes a favorable sort key. As such, this is illustrated through some examples. FIG. 10(a) shows a sort key that gives a favorable ordering since the second tuple finds its dominating tuple right above it. For the same set of tuples, FIG. 10(b) shows that a different ordering is not favorable. The second tuple in FIG. 10(a) now moves to the third and is no longer dominated by the tuple immediately before it. A favorable ordering may not even exist. In FIG. 10(c) and FIG. 10(d) neither ordering on a set of tuples is favorable. In both cases, the fourth tuple cannot find its dominating tuple above. Since the values in $K_i$ are all the same, a sort key corresponding to any other permutations of $K_i$ gives the same ordering as in either FIG. 10(c) or FIG. 10(d). Nevertheless, as further described below, it is possible to remove all spurious tuples by sorting the tuples twice using different sort keys.

To construct a favorable ordering, the $DAG_{ns}$ of an outer-join query is analyzed. It is first considered how to construct a favorable ordering under a special case where $R_b$ satisfies the following inclusion property: $NS_{R_{b1}} \subseteq NS_{R_{b2}} \ldots \subseteq NS_{R_{bk}}$. Here, the nullification sets of $R_b$ include one another. A directed path $NS_1, NS_2, \ldots, NS_j$ (represented by the nullification set of the node) can be found in $DAG_{ns}$ such that all $NS_{R_{b1}}$ are on the path, where $NS_1$ corresponds to root and $NS_j = NS_{R_{bk}}$. This is shown in FIG. 11. Additionally, the plans generated using the methodology of FIG. 6 do not further nullify relations in the root node, which implies $NS_1 \neq NS_{b1}$. The relation set associated with each node $NS_i$ (i=1, . . . , j) is denoted as $S_i$. Then, all remaining relations are organized into j sets, where $S'_i$ is defined as $S'_i = \{R | NS_i \subset NS_R \text{ and } NS_{i+1} \not\subseteq NS_R\}$ for i=1, . . . , j−1 and $S'_j = \{R | NS_j \subset NS_R \text{ and } R \notin S'_1, \ldots, S'_{j-1}\}$. Each $S'_i$ essentially includes relations whose associated nodes are descendants of $NS_i$, but are not descendants of $NS_{i+1}$ in $DAG_{NS}$ (inside each triangular representation in FIG. 11). When a relation R is a descendent of more than one $NS_1$, R is assigned to the $S_i$ with the largest i (although assigning R to any one of the $S_i$ would also be fine). Then, a sort key FSK is constructed as $\langle K_{S_1}, K'_{S_1}, K_{S_2}, K'_{S_2}, \ldots, K_{S_j}, K'_{S_j} \rangle$, where $K_{S_i}$ and $K'_{S_i}$ include the KID of each relation in $S_i$ and $S'_i$, respectively. The relative order of KIDs within each $K_{S_i}$ and $K'_{S_i}$ is not important. Such a sort key gives a favorable ordering.

If $R_b$ satisfies the inclusion property, then the sort key FSK constructed, as described above, produces a favorable ordering on the nullified join result. This can be verified by first, considering that duplicated tuples are clustered together since the sort key includes all KIDs. Considering any dominated tuple t, $K_d$ is given as the leftmost KID in FSK that is dominated by another tuple t'. It can be shown that $K_d$ must belong to a $K_{S_i}$. The reasoning is that the join result before nullification does not contain any dominated tuples, and the KIDs in $K_{S_i}$ are not modified after nullification. Supposing that $K_d \in K_{S_i}$, it can be concluded that KID in $K_{S_i}, K'_{S_i}, K_{S_{i+1}}, K_{S_{i+1}}, \ldots, K_{S_j}, K'_{S_j}$ must all be null. Because tuples are sorted by FSK, the tuple immediately before t must at least match all KIDs in FSK up to, but not including $K_d$ (t' is an example of such a tuple). Since the rest of the attributes in t are all null, t must be dominated by its previous tuple. Therefore, such an ordering is favorable.

When relations in $R_b$ do not satisfy the inclusion property above, in general a single favorable ordering of tuples cannot be found. For example, the tuples in FIGS. 10(c) and 10(d) can be the join result where $R_2$ and $R_3$ are further nullified and are not on the same path in $DAG_{NS}$. However, it is possible to decompose $R_b$ to some smaller relation sets, each of which satisfies the inclusion property and can then be implemented by a basic β query. The problem of finding a minimum number of paths, which cover a subset of nodes in a directed cyclic graph is known to be reducible to a bipartite matching problem. Thus, the above problem may be solved in $O(m\sqrt{n})$ time, where n is the number of nodes and m is the number of pairs that are connected in $DAG_{NS}$. For example, the β operation for tuples in FIG. 8(c) can be implemented by two β queries using $\langle K1, K2, K3 \rangle$ and $\langle K1, K3, K2 \rangle$ as the sort key of each. Practically, most queries only require a single basic β query.

Now, the queries given in FIGS. 1(e) and 1(f) are ready to be completed. Q1 and Q2 can be rewritten as in FIGS. 12(a) and 12(b), respectively. Since the $DAG_{NS}$ (of FIG. 5) of both queries contains a single path, only a single basic β query has to be used. The sort key giving a favorable order is $\langle R.k, S.k \rangle$ for Q1 and $\langle R.k, S.k, T.k \rangle$ for Q2. An optimization is performed in Q1 by excluding T.k from the sort key since T and S are assigned to the same node in $DAG_{ns}$.

With regard to the performance issues in β queries, a basic query requires one sort, and a β operation may need more then one basic β query, which means multiple sorts. Although sorting can be expensive, it pays off when a more beneficial join order can be selected. The optimizer selects the better plan by comparing the estimated costs. Often, a good join order can improve performance by orders of magnitude, whereas the sorting overhead is much less. Also, the methodology provided by the embodiments of the invention greatly simplifies the implementation of the complex β operation. Additionally, it is possible to create a partitioned version of a basic β query by replacing the ORDER BY clause in FIG. 9 with a "PARTITION BY $K_{S_i}, K'_{S_i}$ ORDER BY $K_{S_2}, K'_{S_2}, \ldots, K_{S_j}, K'_{S_j}$," clause. Since KIDs in $K_{S_i}, K'_{S_i}$ are not further nullified, a dominated tuple is never assigned to a different partition than that of its dominator. $K_{i\_p}$ then computes the $K_i$ in a previous tuple within each partition. Moreover, the WHERE clause also needs to be modified slightly in the partitioned version. This alternative has the benefit of being easily parallelizable and can therefore take advantage of the SMP (symmetric multiprocessing) or the MPP (massively parallel processing) in modern commercial database systems.

The following experimental results verify the validity of the advantages and functionality of the methodology provided by the embodiments of the invention. In conducting the validation experiments, tests were conducted using an IBM 44P server (available from IBM Corporation, NY, USA), which has four processors and 3 GB of RAM. The operating system on this machine was an AIX 5.1 operating system. Additionally, the DB2 V8.1 Enterprise Server Edition FP6 (available from IBM Corporation) was used as the database server. A 1 GB TPC-H database was created and all tables were partitioned on their keys. Indexes were also created on the key of each table. The bufferpool size was set to be approximately greater than 1 GB so that all data could reside in memory. The sort heap size, which controls the amount of memory allocated to each sort and hash-join operation, was set to 40 MB.

Next, two queries Q1 and Q2, similar to the two queries shown in FIGS. 1(a) and 1(b), were designed on the TPC-H schema. The SQL of the two queries are given in FIG. 13. As can be seen, relations part, lineitem, and partsupp correspond to the relation R, S, and T in FIGS. 1(a) and 1(b), respectively. In Q1, two predicates are used on relation part to reduce its size. Both predicates can be pushed through the joins and evaluated as local predicates on relation part. In Q2, part_lt_1000 and partsupp_gt_995 are derived from part and partsupp, by limiting the partkey to less than 1,000 and greater than 995, respectively. This query is deliberately constructed to make the join between part and partsupp more attractive. Also, a FETCH FIRST clause is used in both queries to return only the first 100 tuples. However, since the join result is ordered, all tuples in the join result must still be computed.

For Q1, two execution plans are compared; one (Q1) corresponding to the original query and the other (Q1_bm) corresponding to a new query that joins part with lineitem first, but needs compensation in the end. For Q2, three execution plans are compared; Q2 itself, Q2_free in which part joins lineitem first, followed by partsupp (this plan can be directly derived using the transformation rules and does not need further compensation), and Q2_bm where part is joined with partsupp first and a final β operator is needed. The SQL statements for Q1_bm and Q2_bm are constructed in a way similar to that in FIGS. 12(a) and 12(b).

The favorable ordering is given by p_partkey, l_orderkey, l_linenumber⟩ for Q1_bm and p_partkey,l_orderkey,l_linenumber,ps_partkey,ps_suppkey⟩ for Q2_bm. Neither Q1_bm nor Q2_bm can be considered by conventional techniques. Then, the elapsed time is measured for the five plans a few times, with the results illustrated in FIG. 14. As can be seen, compared with their closest competitor, the plans using the methodology provided by the embodiments of the invention run approximately 15 times faster for Q1 and 3.5 times faster for Q2.

Figure 15:
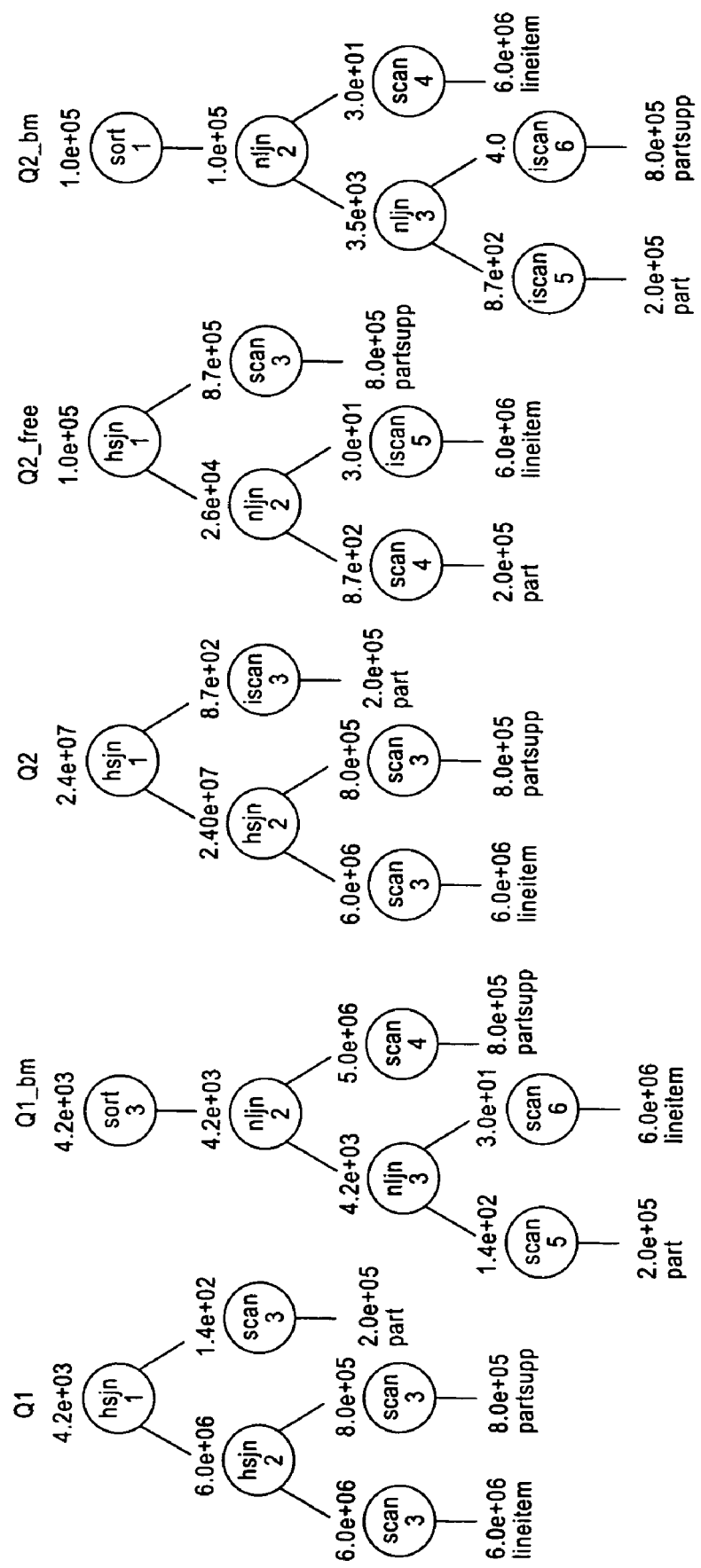
FIG. 15 illustrates the plan generation processes for four queries according to an embodiment of the invention.

To understand why the inventive technique achieves improved results, the execution plan generated by the optimizer for each query is analyzed. The five plans generated by the optimizer are shown in FIG. 15. Each node in the plan tree represents an operator, whose type is given inside the node. The number above each node shows the cardinality after the corresponding operator has been applied. The cardinality from the right side (inner) of a nested loop join represents the per outer cardinality. Each operator is also given a unique number, displayed under its type. The final sort operator is omitted since it is common in all plans. However the sort operator needed for the β operator is shown in Q1_bm and Q2_bm.

In Q1, since lineitem has to be joined with partsupp first, it produces a large intermediate result after the hash join (node 2), which significantly increases the cost for the next hash join (node 1). In Q_bm, since lineitem is joined with part first, the intermediate result (after node 3) becomes much smaller, which makes the second join (node 2) cheaper. Although not shown, the cardinality after node 2 in Q1_bm is slightly larger than that after node 1 in Q1. This is because Q1_bm generates a smaller number of spurious tuples, which are subject to removal. The sort operator (node 1) in Q1_bm is used for generating the favorable ordering. However, since the number of tuples to be sorted is relatively small, sorting does not add too much additional cost to the plan (almost negligible in this example).

With regard to the second query, because of the way Q2, part, and partsupp are constructed, each match many tuples in lineitem, but only a few matches between themselves. Thus, both Q2 and Q2_free have a large intermediate result after the first join, and therefore suffers from a similar performance penalty as in Q1. Joining part and partsupp first (as shown in Q2_bm) is the best approach since it reduces the intermediate result size the most, and also enables the second join to use a much cheaper nested loop join.

One of the assumptions for implementing the methodology provided by the embodiments of the invention is that all of the predicates are null-intolerant. When predicates can tolerate nulls (e.g., R.a is null), the rippling of null values through predicates breaks, and the process of generating nullification sets in the methodology shown in FIG. 3 is no longer valid. Therefore, the relative position of θ operations becomes important and cannot be changed freely.

One solution provided by the embodiments of the invention is to break the original operation tree into multiple smaller trees (blocks), each of which only has null-tolerant predicates at its root. Then, the outerjoin canonical abstraction for each smaller tree can be computed and optimized separately. During planning, one additional rule is applied such that any β operation using a null-tolerant conjunct is always applied last in the β sequence. This way, only the ordering of null-tolerant conjuncts are fixed, thereby still provide freedom to null-intolerant conjuncts.

Furthermore, using an antijoin is useful for handling negated nested queries. An antijoin returns a tuple t in the outer relation (preserving side) if t cannot find any matching tuples in the inner relation (null-producing side). The symbol "▷" is used to denote an antijoin (the arrow pointing to the null-producing side). Antijoins and full outerjoins can be transformed as follows:

$$R \overset{Prs}{\triangleright} S = \sigma_{S.k \text{ is } null}(R \overset{Prs}{\longrightarrow} S)$$

$$R \overset{Prs}{\leftrightarrow} S = R \overset{Prs}{\longrightarrow} S \cup R \overset{Prs}{\triangleleft} S$$

Figure 16A:
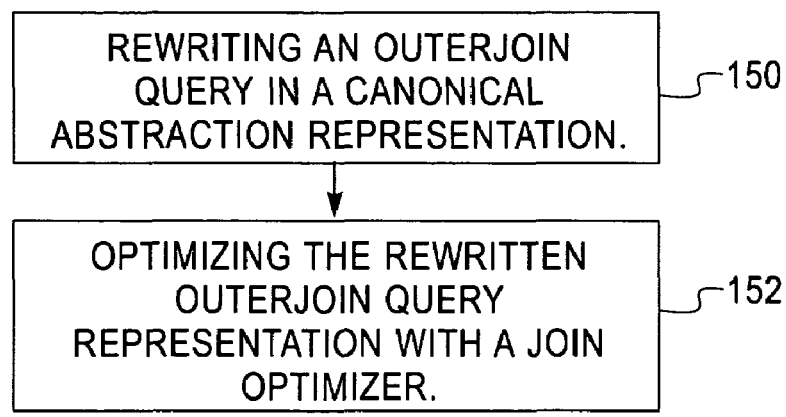
FIG. 16(a) illustrates a flow diagram illustrating a preferred method of an embodiment of the invention.

Since after the transformation there are only left outerjoins, the methodology provided by the embodiments of the invention may be applied. The predicate "S.k is null" is null-tolerant, which limits the reordering of some β operations The flowchart of FIG. 16(a) illustrates a method of optimizing outerjoin queries performed on a database, wherein the method comprises rewriting (150) an outerjoin query in a canonical abstraction representation; and optimizing (152) the rewritten outerjoin query representation with a join optimizer, wherein the outerjoin query comprises any number of left or right outerjoins and inner joins, and wherein join predicates are null-intolerant, and wherein the canonical abstraction representation further comprises producing a sequence of outer Cartesian products; producing a sequence of nullifications for each relation in the query; and performing a final best match operation on the query.

The method further comprises permitting all join orders to be considered during planning on the outerjoin query. In the process of producing a sequence of nullifications, the nullifications are determined by adding all predicates that nullify the relation (directly or indirectly) to a nullification set. The method further comprises, for any join order, applying a proper set of join predicates for each join; determining what nullification operations need to be further applied after all the tables are joined; and determining whether a best match operation should be added after all of the relations are joined. Additionally, the method comprises implementing the final best match operation by sorting (if not already sorted) an input into the final best match operation in one or more passes and applying filtering on each pass, wherein a number of sorting passes is minimized by analyzing the nullification set, and wherein the implementing of the final best match operation is performed using an online analytical processing (OLAP) functionality in a standard structured query language (SQL).

Figure 16B:
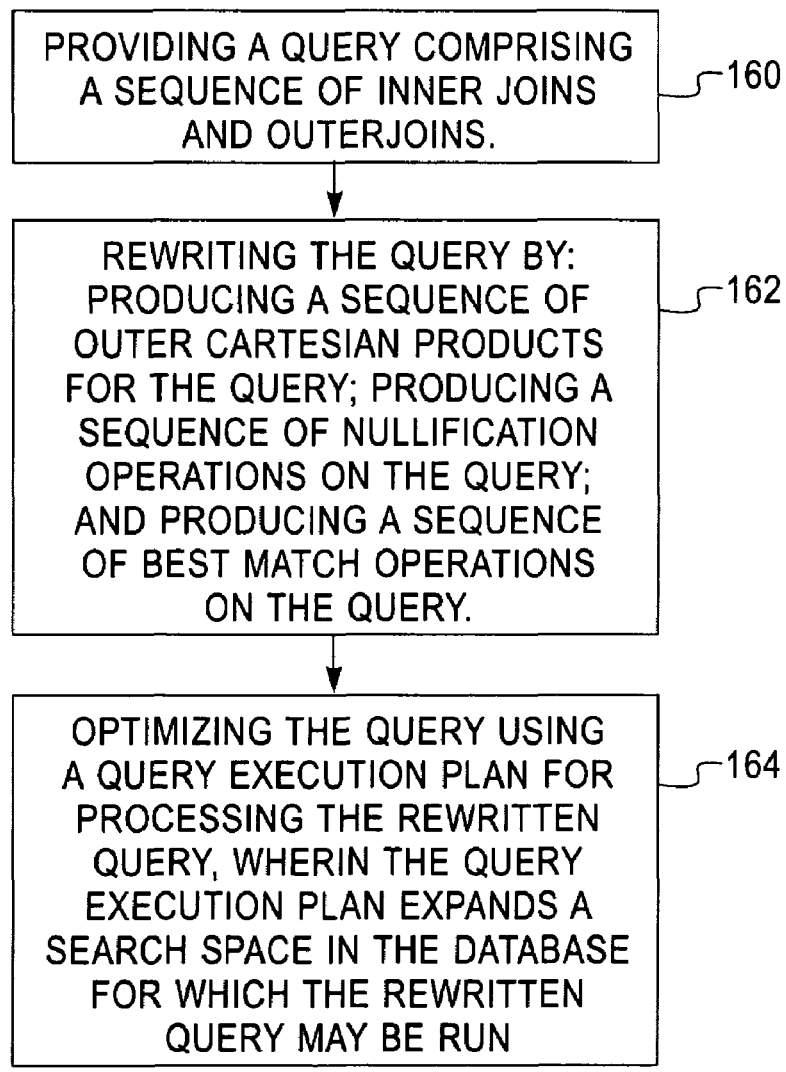
FIG. 16(b) illustrates a flow diagram illustrating a preferred method of another embodiment of the invention.

The flowchart of FIG. 16(b) illustrates a method of optimizing queries used for searching a computerized database, wherein the method comprises providing (160) a query comprising a sequence of inner joins and outerjoins; and rewriting the query (162) by producing a sequence of outer Cartesian products for the query; producing a sequence of nullification operations on the query; and producing a sequence of best match operations on the query. The method further comprises optimizing (164) the query using a query execution plan for processing the rewritten query, wherein the query execution plan expands a search space in the database for which the rewritten query may be run.

Figure 17A:
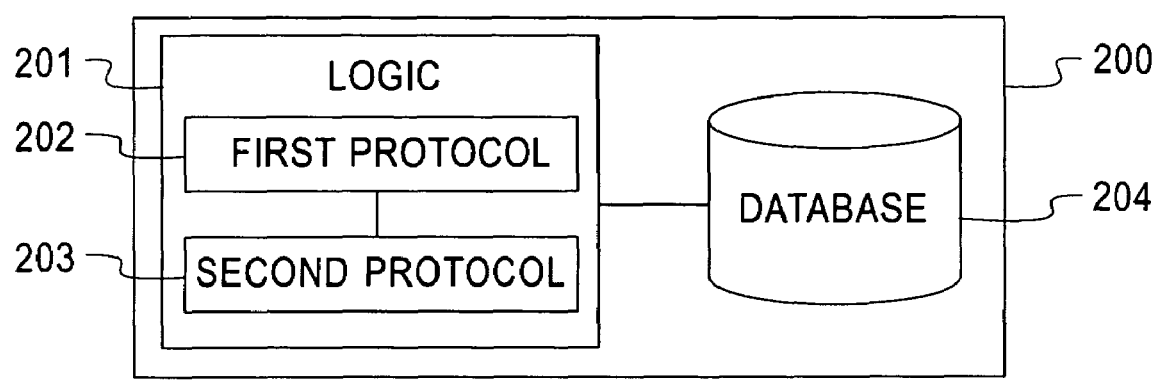
FIG. 17(a) illustrates a block diagram for an apparatus according to an embodiment of the invention.
Figure 17B:
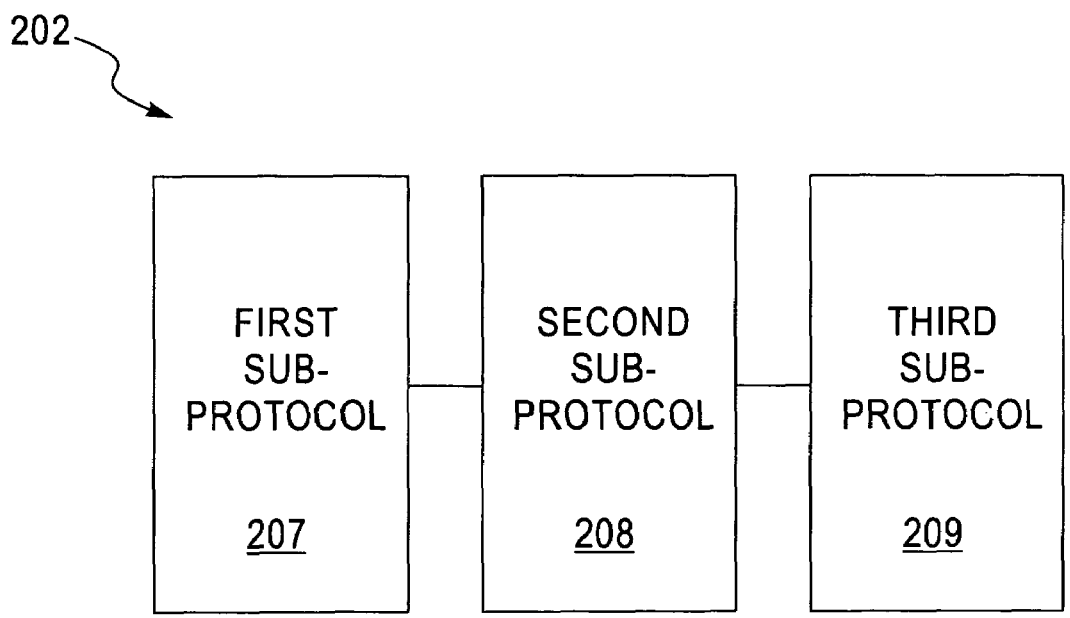
FIG. 17(b) illustrates an isolated block diagram for a portion of the apparatus of FIG. 17(a) according to an embodiment of the invention.

Another embodiment of the invention is illustrated in the block diagrams in FIGS. 17(a) and 17(b), which provide a computer-implemented apparatus for optimizing outerjoin queries, wherein the apparatus comprises a computer system 200, wherein the query optimization is performed by the computer system 200 to optimize queries performed on a database 204 stored on the computer system 200; and computer logic 201, performed by the computer system 200, wherein the computer logic comprises a first protocol 202 adapted to rewrite an outerjoin query in a canonical abstraction representation; and a second protocol 203 adapted to optimize the rewritten outerjoin query representation with a join optimizer. The outerjoin query comprises any number of left or right outerjoins and inner joins, and wherein join predicates are null-intolerant. Moreover, the canonical abstraction representation of the first protocol 202 further comprises a first sub-protocol 207 adapted to produce a sequence of outer Cartesian products; a second sub-protocol 208 adapted to produce a sequence of nullifications for each relation in the query; and a third sub-protocol 209 adapted to perform a final best match operation on the query.

Figure 18:
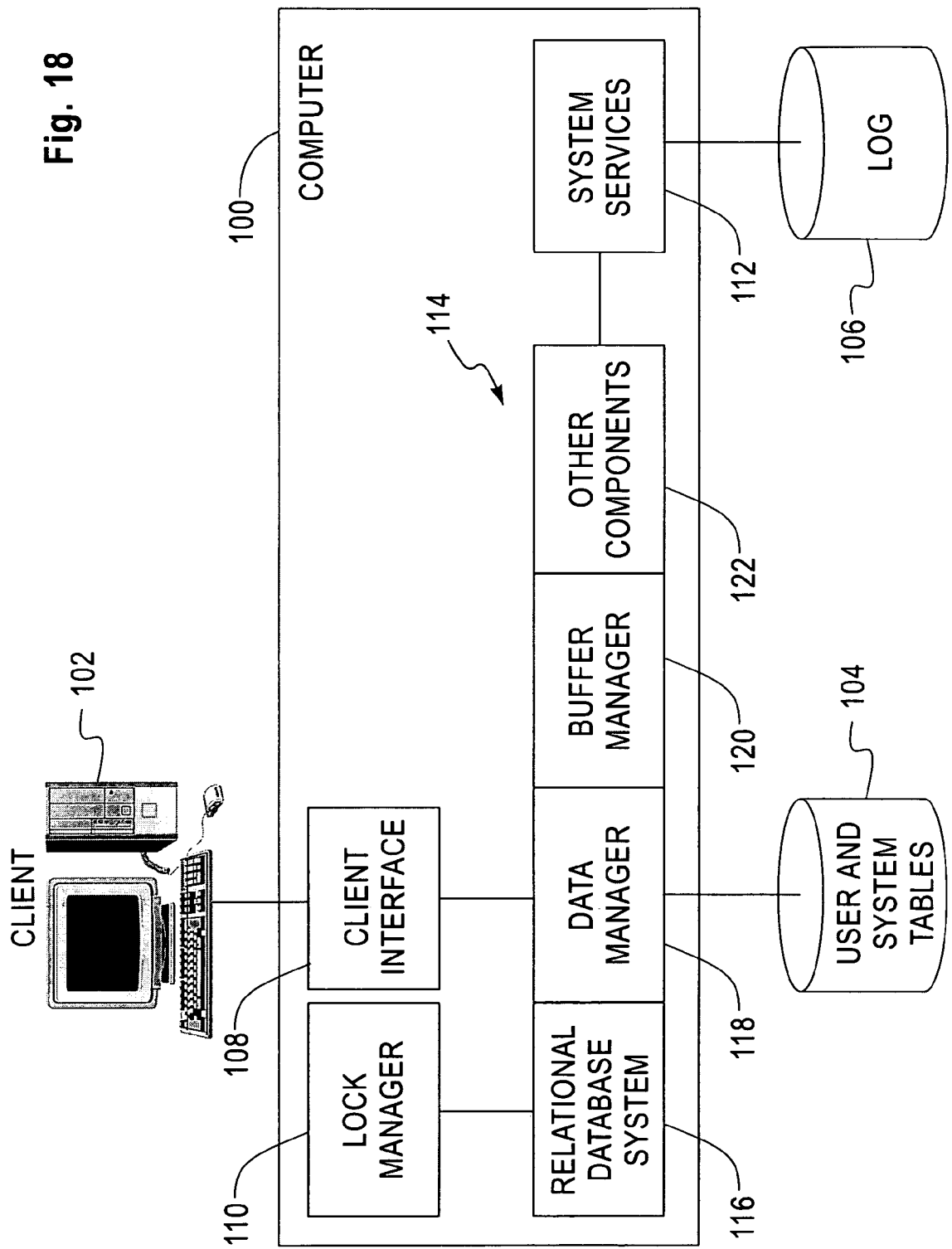
FIG. 18 illustrates a computer hardware environment for implementing an embodiment of the invention.

FIG. 18 illustrates an exemplary hardware and software environment that could be used with the preferred embodiment of the invention. In the exemplary environment, a server computer 100 is connected to one or more client computers 102 or terminals. The server computer 100 executes a relational database management system (RDBMS) that manages user and system tables 104 and includes a system log 106. In the preferred embodiment of the invention, the RDBMS comprises the DataBase 2 (DB2198) Universal DataBase (UDB™) product available from IBM Corporation, although those skilled in the art will recognize that the embodiments of the invention have application to any RDBMS. The client computers 102 interface to the RDBMS via a client interface component 108.

As illustrated in FIG. 18, the RDBMS includes three major components: the Resource Lock Manager (RLM) 110, the Systems Services module 112, and the Database Services module 114. The RLM 110 handles locking services, because the RDBMS treats data as a shared resource, thereby allowing any number of users to access the same data simultaneously, and thus concurrency control is required to isolate users and to maintain data integrity. The Systems Services module 112 controls the overall RDBMS execution environment, including managing log data sets 106, gathering statistics, handling startup and shutdown, and providing management support.

Central to the RDBMS is the Database Services module 114. The Database Services module 114 contains several submodules, including a Relational Database System (RDS) 116, Data Manager 118, Buffer Manager 120, and Other Components 122 such as an SQL compiler/interpreter. These submodules support the functions of the SQL language, i.e., definition, access control, retrieval, and update.

Generally, the RDBMS comprises logic and/or data that is embodied in or retrievable from a device, medium, or carrier, e.g., a fixed or removable data storage device, a remote device coupled to the computer by a data communications device, etc. Moreover, this logic and/or data, when read, executed, and/or interpreted by the computer 100, cause the computer 100 to perform the steps necessary to implement and/or use the embodiments of the invention.

Thus, the embodiments of the invention may be implemented as a method, apparatus, or article of manufacture using standard programming and/or engineering techniques to produce software, firmware, hardware, or any combination thereof. The term "article of manufacture" as used herein is intended to encompass logic and/or data embodied in or accessible from any device, carrier, or media.

Of course, those skilled in the art will recognize many modifications may be made to this configuration without departing from the scope of the embodiments of the invention. For example, those skilled in the art will recognize that any combination of the above components, or any number of different components, including computer programs, peripherals, and other devices, may be used to implement the embodiments of the invention, so long as similar functions are performed thereby.

Figure 19:
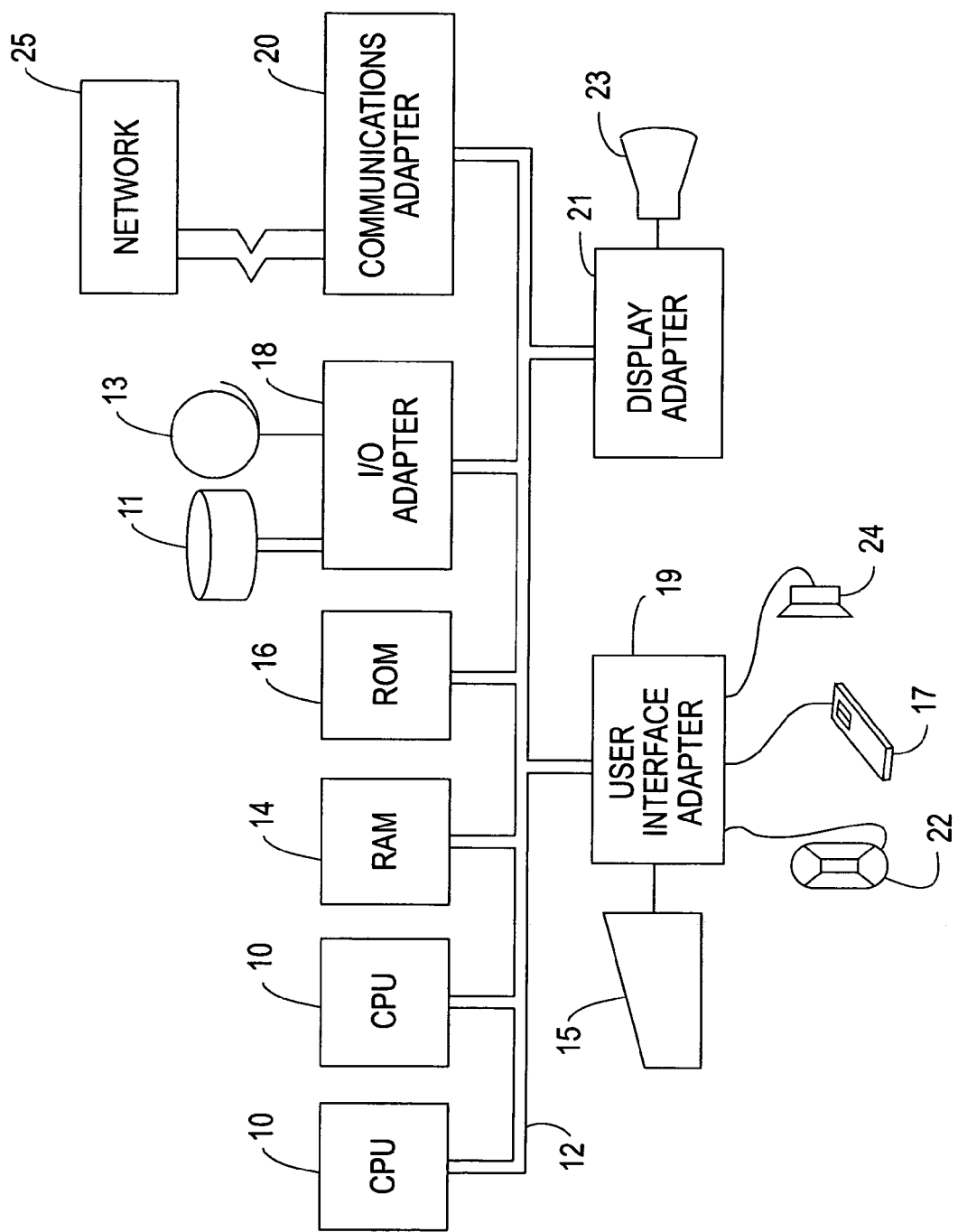
FIG. 19 illustrates a computer system diagram according to an embodiment of the invention.

Another representative hardware environment for practicing the embodiments of the invention is depicted in FIG. 19. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Generally, the embodiments of the invention provide a novel canonical abstraction for outerjoin queries. Under such abstraction, an outerjoin query can be rewritten as a sequence of outer Cartesian products, followed by nullification operations and a final best match operation. The inventive abstraction resembles that for inner join queries by allowing all join orders and preserving the property of commutativity and transitivity. As a result, the inventive technique provides more powerful query optimization than any existing query optimization techniques.

Moreover, for a given outerjoin query, the embodiments of the invention provide a method of producing its outerjoin canonical abstraction and extend an inner join optimizer to generate plans in an expanded search space by taking advantage of the abstraction. Additionally, the embodiments of the invention also provide an efficient implementation of the best match operation based on the OLAP amendment in SQL. Furthermore, experimental results derived from testing conducted on a commercial database system demonstrate the performance advantage of the inventive technique.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the invention has been described in terms of preferred embodiments, those skilled in the art will recognize that the invention can be practiced with modification within the spirit and scope of the appended claims.

What is claimed is:

1. A computer-implemented method of optimizing outerjoin queries performed on a database, said method comprising:

using a computer system for rewriting an outerjoin query in a canonical abstraction representation, wherein said outerjoin query is represented by an operator tree where all leaf nodes are base relations and all inner nodes are join operators, wherein said outerjoin query comprises any number of left or right outerjoins and inner joins, wherein join predicates are null-intolerant, and wherein said canonical abstraction representation includes:

producing a sequence of outer Cartesian products;

producing a sequence of nullifications for each relation in said outerjoin query wherein in said producing a sequence of nullifications, said nullifications are determined by adding all predicates that nullify said relation to a nullification set; and performing a final best match operation on said outerjoin query by decomposing said operator tree into smaller trees each of which only has null-tolerant predicates at a root of said operator tree;

using said computer system for implementing said final best match operation by sorting an input into said final best match operation in one or more passes and applying filtering on each pass, wherein a number of sorting passes is minimized by analyzing said nullification set, and wherein said implementing of said final best match operation is performed using an online analytical processing (OLAP) functionality in a standard structured query language (SQL);

using said computer system for optimizing the rewritten outerjoin query representation with a join optimizer; and using said computer system for considering all join orders during planning on said outerjoin query, wherein for any join order:

using said computer system for applying a proper set of join predicates for each join;

using said computer system to determine further application of nullification operations; and using said computer system for adding an added best match operation after all relations are joined, if after joining said relations, analysis of said relations warrants said added best match operation.

2. A program storage device readable by computer comprising a program of instructions executable by said computer to perform a method of optimizing outerjoin queries performed on a database, said method comprising:

rewriting an outerjoin query in a canonical abstraction representation, wherein said outerjoin query is represented by an operator tree where all leaf nodes are base relations and all inner nodes are join operators, wherein said outerjoin query comprises any number of left or right outerjoins and inner joins, wherein join predicates are null-intolerant, and wherein said canonical abstraction representation includes:

producing a sequence of outer Cartesian products;

producing a sequence of nullifications for each relation in said query wherein in said producing a sequence of nullifications, said nullifications are determined by adding all predicates that nullify said relation to a nullification set; and performing a final best match operation on said query by decomposing said operator tree into smaller trees each of which only has null-tolerant predicates at a root of said operator tree;

implementing said final best match operation by sorting an input into said final best match operation in one or more passes and applying filtering on each pass, wherein a number of sorting passes is minimized by analyzing said nullification set, and wherein said implementing of said final best match operation is performed using an online analytical processing (OLAP) functionality in a standard structured query language (SQL);

optimizing the rewritten outerjoin query representation with a join optimizer; and considering all join orders during planning on said outerjoin query, wherein for any join order:

using said computer for applying a proper set of join predicates for each join;

using said computer to determine further application of nullification operations; and using said computer for adding an added best match operation after all relations are joined, if after joining said relations, analysis of said relations warrants said added best match operation.

3. A system for optimizing queries used for searching a computerized database, said system comprising:

one or more processors with storage memory, wherein the storage memory has computer executable instructions embedded thereon and executed by the one or more processors to:

rewrite an outerjoin query in a canonical abstraction representation, wherein said outerjoin query is represented by an operator tree where all leaf nodes are base relations and all inner nodes are join operators, wherein said outerjoin query comprises any number of left or right outerjoins and inner joins, wherein join predicates are null-intolerant, and wherein said canonical abstraction representation includes:

produce a sequence of outer Cartesian products;

produce a sequence of nullifications for each relation in said outerjoin query wherein in said producing a sequence of nullifications, said nullifications are determined by adding all predicates that nullify said relation to a nullification set; and perform a final best match operation on said query by decomposing said operator tree into smaller trees each of which only has null-tolerant predicates at a root of said operator tree;

implement said final best match operation by sorting an input into said final best match operation in one or more passes and applying filtering on each pass, wherein a number of sorting passes is minimized by analyzing said nullification set, and wherein said implementing of said final best match operation is performed using an online analytical processing (OLAP) functionality in a standard structured query language (SQL);

optimize the rewritten outerjoin query representation with a join optimizer; and consider all join orders during planning on said outerjoin query, wherein for any join order:
  applying a proper set of join predicates for each join;
  determining further application of nullification operations; and
  adding an added best match operation after all relations are joined, if after joining said relations, analysis of said relations warrants said added best match operation.

* * * * *